United States Patent
Choi et al.

(10) Patent No.: US 10,250,361 B2
(45) Date of Patent: Apr. 2, 2019

(54) METHOD AND APPARATUS FOR TRANSMITTING DATA UNIT COMPRISING GUARD INTERVALS HAVING DIFFERENT LENGTHS

(71) Applicant: LG ELECTRONICS INC., Seoul (KR)

(72) Inventors: Jinsoo Choi, Seoul (KR); Wookbong Lee, Seoul (KR); Dongguk Lim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 15/325,397

(22) PCT Filed: Jun. 10, 2015

(86) PCT No.: PCT/KR2015/005808
§ 371 (c)(1),
(2) Date: Jan. 10, 2017

(87) PCT Pub. No.: WO2016/021819
PCT Pub. Date: Feb. 11, 2016

(65) Prior Publication Data
US 2017/0201357 A1 Jul. 13, 2017

Related U.S. Application Data

(60) Provisional application No. 62/033,087, filed on Aug. 4, 2014.

(51) Int. Cl.
*H04L 27/26* (2006.01)
*H04L 5/00* (2006.01)
(Continued)

(52) U.S. Cl.
CPC ........ *H04L 5/0007* (2013.01); *H04L 27/2605* (2013.01); *H04L 27/2613* (2013.01);
(Continued)

(58) Field of Classification Search
CPC ............... H04L 1/0079; H04L 27/2666; H04L 27/2628; H04L 27/2646; H04B 7/0851; H04B 7/0684
See application file for complete search history.

(56) References Cited

U.S. PATENT DOCUMENTS

2005/0163261 A1* 7/2005 Nakao ................. H04B 7/0874
375/343
2010/0260159 A1* 10/2010 Zhang ................ H04L 27/2613
370/338

(Continued)

OTHER PUBLICATIONS

PCT International Application No. PCT/KR2015/005808, International Search Report dated Sep. 18, 2015, 2 pages.

*Primary Examiner* — Salvador E Rivas
(74) *Attorney, Agent, or Firm* — Lee, Hong, Degerman, Kang & Waimey

(57) ABSTRACT

Disclosed are a method and an apparatus for transmitting a data unit comprising guard intervals having different lengths. A method for transmitting a data unit in a wireless LAN comprises the steps of: a transmission STA generating a PPDU; and the transmission PPDU transmitting the PPDU to one or more reception STAs, wherein the PPDU sequentially comprises a first signal field, a second signal field, and a training field, wherein the first signal field is generated on the basis of a first IFFT size and is transmitted in a first OFDM symbol, the second signal field is generated on the basis of the first IFFT size and is transmitted in a second OFDM symbol, and the training field is generated on the basis of a second IFFT size and is transmitted in a third OFDM symbol.

8 Claims, 12 Drawing Sheets

(51) Int. Cl.
*H04W 72/04* (2009.01)
*H04W 84/12* (2009.01)
*H04W 88/08* (2009.01)

(52) U.S. Cl.
CPC ...... *H04L 27/2628* (2013.01); *H04L 27/2646* (2013.01); *H04L 27/2666* (2013.01); *H04W 72/0413* (2013.01); *H04W 84/12* (2013.01); *H04W 88/08* (2013.01)

(56) References Cited

U.S. PATENT DOCUMENTS

| | | |
|---|---|---|
| 2012/0213214 A1 | 8/2012 | Vermani et al. |
| 2013/0128807 A1 | 5/2013 | Vermani et al. |
| 2013/0229996 A1* | 9/2013 | Wang ................ H04W 72/0413 370/329 |
| 2013/0266083 A1 | 10/2013 | Baik et al. |
| 2013/0286938 A1 | 10/2013 | Porat |
| 2014/0211775 A1 | 7/2014 | Sampath et al. |
| 2015/0334708 A1* | 11/2015 | Lee ........................... H04L 1/00 370/329 |

* cited by examiner

METHOD AND APPARATUS FOR TRANSMITTING DATA UNIT COMPRISING GUARD INTERVALS HAVING DIFFERENT LENGTHS

CROSS-REFERENCE TO RELATED APPLICATIONS

This application is the National Stage filing under 35 U.S.C. 371 of International Application No. PCT/KR2015/005808, filed on Jun. 10, 2015, which claims the benefit of U.S. Provisional Application No. 62/033,087, filed on Aug. 4, 2014, the contents of which are all hereby incorporated by reference herein in their entirety.

BACKGROUND OF THE INVENTION

Field of the Invention

The present invention relates to wireless communication, and more particularly, to a method and an apparatus for transmitting a data unit in a wireless local area network (WLAN).

Related Art

Data is delivered through data units that are referred to as a physical layer protocol data unit (PPDU) of the IEEE 802.11. The PPDU may broadly include a physical (PHY) preamble, a PHY header, and a Physical layer service data unit (PSDU). The PHY preamble is used for delivery, such as signal detection, time and frequency synchronization, channel estimation, and so on, and may include a training symbol. The PHY header may transmit a TXVECTOR. As a medium access control) protocol data unit (MAC PDU), the PSDU may correspond to information that is sent down from the MAC layer. As a data unit that is generated in the MAC layer, the MPDU may include a MAC header and a MAC service data unit MSDU.

The goal of the next generation WLAN system is 1) to enhance a 802.11 physical (PHY) layer and a MAC(medium access control) layer in bands of 2.4 GHz and 5 GHz, etc., 2) to enhance spectrum efficiency and area throughput, and 3) to enhance performance in actual indoor environments and outdoor environments, such as an environment where an interference source exists, a dense heterogeneous network environment, an environment where user load exists, and so on. The scenario that is mostly considered in the next generation WLAN system corresponds to a dense environment where a large number of access points (APs) and stations (STAs) exist. In the next generation WLAN system, discussion is made on the enhancement of spectrum efficiency and area throughput under such environments. Most particularly, in addition to the indoor environments, the next generation WLAN system is interested in actually enhancing the performance in outdoor environments, which was not significantly considered in the conventional WLAN system.

Furthermore, in the next generation WLAN system, extensive discussion is expected to be carried out on the enhancement of system performance in an overlapping basic service set (OBSS) environment, the enhancement of performance in outdoor environments, cellular off-loading, and so on, rather than the enhancement of a single link performance in a single basic service set (BSS).

SUMMARY OF THE INVENTION

The present invention provides a method for transmitting a data unit comprising guard intervals having different lengths.

The present invention also provides an apparatus for transmitting a data unit comprising guard intervals having different lengths.

In an aspect, a method for transmitting a data unit in a wireless LAN system includes: generating, by a transmission station (STA), a PHY protocol data unit (PPDU); and transmitting, by the transmission STA, the PPDU to at least one reception STA, wherein the PPDU sequentially a first signal field, a second signal field, and a training field, the first signal field is generated based on a first inverse fast Fourier transform (IFFT) size and transmitted on a first orthogonal frequency division multiplexing (OFDM) symbol, the second signal field is generated based on the first IFFT size and transmitted on a second OFDM symbol, the training field is generated based on a second IFFT size and transmitted on a third OFDM symbol, the second IFFT size is integer times larger than the first IFFT size, a total symbol duration of the first OFDM symbol includes a first guard interval (GI) duration determined based on the first IFFT size and a first valid symbol duration determined based on the first IFFT size, the total symbol duration of the second OFDM symbol includes a second GI duration which is integer times longer than the first GI duration and the first valid symbol duration, and the total symbol duration of a third OFDM symbol includes a third guard interval (GI) duration determined based on the second IFFT size and a second valid symbol duration determined based on the first IFFT size.

In another aspect, a station (STA) transmitting a data unit in a wireless LAN, includes: a radio frequency (RF) unit transmitting and receiving a radio signal; and a processor operatively connected with the RF unit, wherein the processor is implemented to generate a PHY protocol data unit (PPDU), and transmit the PPDU to at least one reception STA, the PPDU sequentially a first signal field, a second signal field, and a training field, the first signal field is generated based on an inverse fast Fourier transform (IFFT) size and transmitted on a first orthogonal frequency division multiplexing (OFDM) symbol, the second signal field is generated based on the first IFFT size and transmitted on a second OFDM symbol, the training field is generated based on a second IFFT size and transmitted on a third OFDM symbol, the second IFFT size is integer times larger than the first IFFT size, a total symbol duration of the first OFDM symbol includes a first guard interval (GI) duration determined based on the first IFFT size and a first valid symbol duration determined based on the first IFFT size, the total symbol duration of the second OFDM symbol includes a second GI duration which is integer times longer than the first GI duration and the first valid symbol duration, and the total symbol duration of a third OFDM symbol includes a third guard interval (GI) duration determined based on the second IFFT size and a second valid symbol duration determined based on the first IFFT size.

Data units having different guard interval lengths are defined to increase efficiency of a wireless LAN system indoors/outdoors.

DESCRIPTION OF EXEMPLARY EMBODIMENTS

Figure 1:
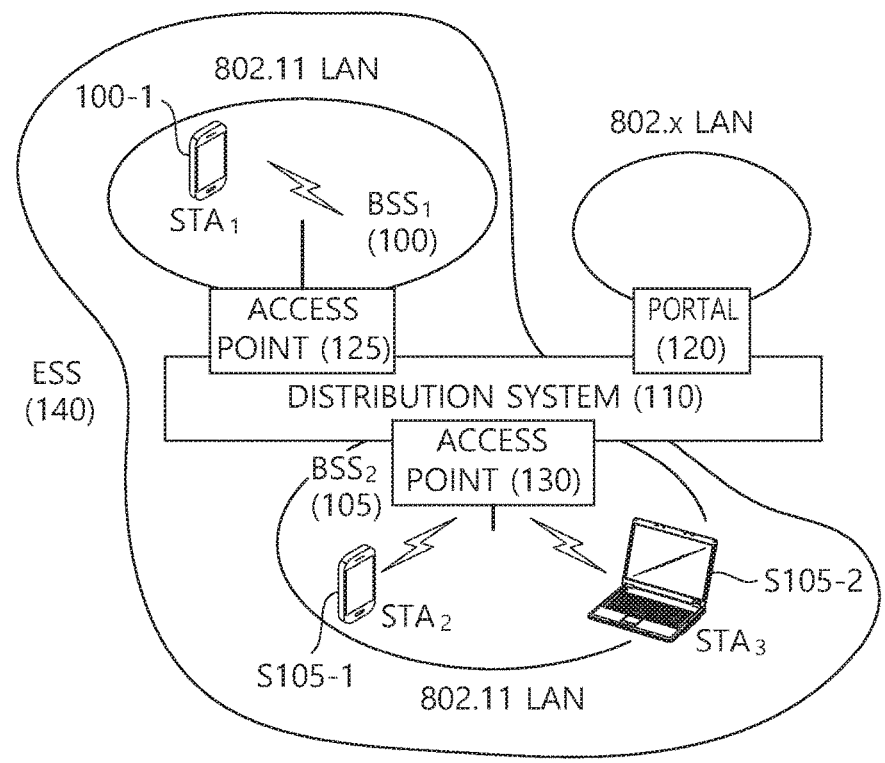
FIG. 1 is a conceptual view illustrating the structure of a wireless local area network (WLAN).
Figure 1:
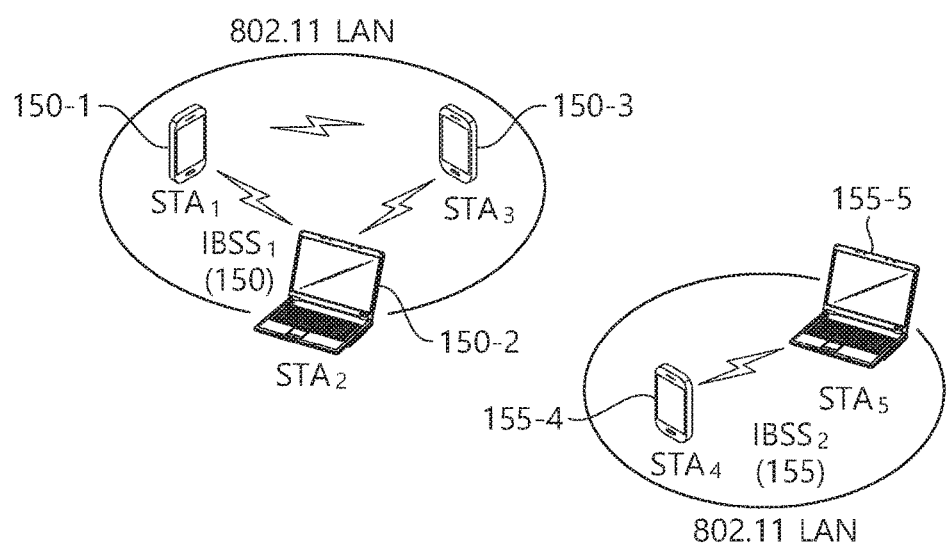

FIG. 1 is a conceptual view illustrating the structure of a wireless local area network (WLAN).

An upper part of FIG. 1 shows the structure of the institute of electrical and electronic engineers (IEEE) 802.11 infrastructure network.

Referring to the upper part of FIG. 1, the WLAN system may include one or more basic service sets (BSSs) 100 and 105. The BSS 100 or 105 is a set of an access point (AP) such as AP 125 and a station (STA) such as STA1 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same service set identification (SSID).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent basic service set (BSS).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the Institute of Electrical and Electronics Engineers (IEEE) 802.11 standards and that includes a physical layer interface for radio media, and the term "STA" may, in its definition, include both an AP and a non-AP station (STA).

The STA may be referred to by various terms such as mobile terminal, wireless device, wireless transmit/receive unit (WTRU), user equipment (UE), mobile station (MS), mobile subscriber unit, or simply referred to as a user.

An AP which operates in a wireless LAN system may transmit data through overlapped time resources to a plurality of respective STAs. If the transmission from the AP to the STA is referred to as downlink transmission, the transmission of the AP may be expressed as a term called downlink multi-user transmission (or DL MU transmission). On the contrary, DL single user (SU) transmission may be downlink transmission from AP to one STA on all transmission resources.

Further, in the existing wireless LAN system, the AP may perform the downlink (DL) multi-user (MU) transmission based on multiple input multiple output (MU MIMO) and the transmission may be expressed as a term called DL MU MIMO transmission. In the exemplary embodiment of the present invention, the AP may perform may perform the DL MU transmission based on orthogonal frequency division multiple access (OFDMA) and the transmission may be expressed as a term called DL MU OFDMA transmission. When the DL MU OFDMA transmission is performed, the AP may transmit the downlink data (alternatively, a downlink frame and a downlink PPDU) to the plurality of respective STAs through a plurality of respective frequency resources (alternatively, a plurality of subbands (alternatively, sub channels) on the overlapped time resources. The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

A PPDU, a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU) or MAC payload). The PPDU header may include a PHY header and a PHY preamble. The PSDU (alternatively, MPDU) may be a data unit including a frame or the frame. The PSDU may also be expressed as terms of a data field and a MAC payload.

On the contrary, transmission from the STA to the AP may be referred to as uplink transmission and data transmission to the APs on the overlapped time resources of the plurality of STAs may be expressed as a term called uplink multi-user transmission (UL MU transmission). The UL SU transmission may indicate uplink transmission from one STA to one AP on all transmission resources. The UL MU transmission may also be supported in the wireless LAN system according to the embodiment of the present invention, unlike the existing wireless LAN system which permits only the UL SU transmission. The PPDU, the frame, and the data transmitted through the uplink may be expressed as terms called an uplink PPDU, an uplink frame, and uplink data, respectively. The uplink transmission by the plurality of respective STAs may be performed in a frequency domain or a spatial domain.

When the uplink transmission by the plurality of respective STAs is performed in the frequency domain, different frequency resources may be allocated to the plurality of respective STAs as uplink transmission resources based on the OFDMA. The plurality of respective STAs may transmit uplink data to the AP through the different allocated frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

The subband may be a minimum frequency resource unit for the DL MU OFDMA transmission/UL MU OFDMA transmission. All of the frequency resources may include at least one channel and one channel may include at least one subband. The subband may have the same bandwidth size as the channel, or a plurality of subbands may be included in one channel.

Next generation wireless LAN systems require high throughput and enhancement of quality of experience (QoE) performance. A new data transmission format (for example, a PPDU format and a frame format) needs to be defined in order to enhance the performance of the wireless LAN system.

The new data transmission format defined for the next generation wireless LAN system needs to coexist with a data transmission format for legacy STAs which operate in the existing wireless LAN system. The legacy STA may not know whether the next generation wireless LAN system is operated and characteristics of the next generation wireless LAN system. Therefore, the new data transmission format should be defined without affecting the operation of the existing legacy STA.

In addition, the next generation wireless LAN system needs to effectively support data transmission not only in an indoor environment but also in an outdoor environment, unlike the existing wireless LAN system. When the new data transmission format is defined as different structures according to the indoor environment/the outdoor environment, system complexity of the next generation wireless LAN system may increase and it may be difficult to implement the next generation wireless LAN system.

When the data transmission format is defined as the different structures according to the indoor environment/the outdoor environment, a problem caused by inter symbol interference (ISI) due to a longer delay spread in the indoor environment may be relatively less serious than the outdoor environment. Thus, the throughput may be designed to be optimized without increasing a cyclic prefix (CP) length (or guard interval (GI) length). On the contrary, in the outdoor environment, the problem caused by the ISI may be relatively more serious than indoor environment. Therefore, the data transmission format may be designed to have a relatively long GI. The GI may be interpreted as the same meaning as the CP.

However, the design of the data transmission format may increase the system complexity of the next generation wireless LAN system and make it difficult to implement the next generation wireless LAN system. Therefore, in the embodiment of the present invention, disclosed is a data transmission format that may be integrally operated in the indoor/outdoor environment in order to increase the efficiency of the wireless LAN system without increasing the complexity of the next generation wireless LAN system.

Hereinafter, in the embodiment of the present invention, the existing WLAN system may be expressed as a term called a legacy (or non-HE) wireless LAN system, the existing STA may be expressed as a term called a legacy (or non-HE) STA, the existing frame may be expressed as a legacy (or non-HE) frame, and the existing PPDU may be expressed as a legacy (or non-HE) PPDU. In addition, the wireless LAN system according to the embodiment of the present invention may be expressed as a term called a high efficiency (HE) wireless LAN system, the STA according to the embodiment of the present invention may be expressed as a term called a HE STA, the AP according to the embodiment of the present invention may be expressed as a term called a HE AP, the frame according to the embodiment of the present invention may be expressed as a term called a HE frame, and the PPDU according to the embodiment of the present invention may be expressed as a term called an HE PPDU.

Respective fields included in the HE PPDU according to the embodiment of the present invention may be generated based on an inverse fast Fourier transform (IFFT) (or an inverse discrete Fourier transform (IDFT)) having different sizes. As another expression, the respective fields included in the HE PPDU according to the embodiment of the present invention may be generated based on a fast Fourier transform (FFT) (or a discrete Fourier transform (DFT)) having different sizes.

The HE PPDU may include a non-HE portion (or legacy portion) and a HE portion (non-legacy portion). The non-HE portion may include fields decodable by the legacy STA and the legacy AP. The HE portion may include fields decodable by the HE STA and the HE AP. According to the embodiment of the present invention, the non-HE portion of the HE PPDU may be generated based on a first IFFT size and some of the fields included in the HE portion of the HE PPDU may be generated based on the first IFFT size and the remaining fields may be generated based on a second IFFT size.

For example, the second IFFT size may be four times larger than the first IFFT size. When the second IFFT size is four times larger than the first IFFT size, the HE PPDU may be generated based on the IFFT that is four times larger than the non-HE PPDU based on a given bandwidth. The IFFT that is four times larger than the non-HE PPDU may be applied to specific fields (e.g., HE-STF included in the HE portion of the HE PPDU and fields after the HE-STF) of the HE PPDU.

Hereinafter, in Table 1, OFDM numerology for generating the HE PPDU used in an HE wireless LAN system according to the embodiment of the present invention is disclosed.

Referring to Table 1, an IFFT size that is four times larger than the IFFT size for the generation of the non-HE PPDU for the given bandwidth may be used for the generation of the HE PPDU. For example, when a 64-sized IFFT is used based on a 20 MHz bandwidth to generate the non-HE PPDU, a 256-sized IFFT may be used to generate some fields included in the HE PPDU. Further, it is assumed that each band includes three DCs (DC tones or DC subcarriers).

TABLE 1

| Parameter | CBW20 | CBW40 | CBW80 | CBW80 + 80 | CBW160 | Description |
|---|---|---|---|---|---|---|
| $N_{FFT}$ | 256 | 512 | 1024 | 1024 | 2048 | FFT size |
| $N_{SD}$ | 238 | 492 | 1002 | 1002 | 2004 | Number of complex data numbers per frequency segment |
| $N_{SP}$ | 4 | 6 | 8 | 8 | 16 | Number of pilot values per frequency segment |
| $N_{ST}$ | 242 | 498 | 1010 | 1010 | 2020 | Total number of subcarriers per frequency segment. $N_{ST} = N_{SD} + N_{SP}$ |
| $N_{SR}$ | 122 | 250 | 506 | 506 | 1018 | Highest data subcarrier index per frequency segment |
| $N_{Seg}$ | 1 | 1 | 1 | 2 | 1 | Number of frequency segments |
| $\Delta_F$ | | | 312.5 kHz | | | Subcarrier frequency Spacing for non-HE portion |
| $\Delta_{F\_HE}$ | | | 78.125 kHz | | | Subcarrier frequency Spacing for HE portion |
| $T_{DFT}$ | | | 3.2 μs | | | IDFT/DFT period for non-HE portion |
| $T_{DFT\_HE}$ | | | 12.8 μs | | | IDFT/DFT period for HE portion |
| $T_{GI}$ | | | 0.8 μs = $T_{DFT}/4$ | | | Guard interval duration for non-HE portion |
| $T_{GI\_HE}$ | | | 3.2 μs = $T_{DFT\_HE}/4$ | | | Guard interval duration for HE portion |
| $T_{GI2}$ | | | 1.6 μs | | | Double guard interval duration for non-HE portion |
| $T_{GIS\_HE}$ | | | 0.8 μs = $T_{DFT\_HE}/16$ | | | Short guard interval Duration (used only for HE data) |
| $T_{SYML}$ | | | 4 μs = $T_{DFT} + T_{GI}$ | | | Long GI symbol interval for non-HE portion |
| $T_{SYML\_HE}$ | | | 16 μs = $T_{DFT\_HE} + T_{GI\_HE}$ | | | Long GI symbol interval for HE portion |
| $T_{SYMS}$ | | | 13.6 μs = $T_{DFT\_HE} + T_{GIS\_HE}$ | | | Short GI symbol interval (used only for HE data) |
| $T_{SYM}$ | | | TSYML or TSYMS depending on the GI used | | | Symbol interval |
| $T_{L-STF}$ | | | 8 μs = 10 * $T_{DFT}/4$ | | | non-HT(or legacy) Short Training field duration |
| $T_{L-LTF}$ | | | 8 μs = 2 × $T_{DFT} + T_{GI2}$ | | | non-HT(or legacy) Long Training field duration |
| $T_{L-SIG}$ | | | 4 μs = $T_{SYML}$ | | | non-HT(or legacy) SIGNAL field duration |
| $T_{HE-SIGA}$ | | | 12.8 μs = 2($T_{SYML} + 3T_{GI}$) | | | HE-Signal A field duration |
| $T_{HE-STF}$ | | | $T_{SYML\_HE}$ | | | HE Short Training field duration |
| $T_{HE-LTF}$ | | | $T_{SYML\_HE}$ | | | Duration of each HE-LTF symbol |
| $T_{HE-SIGB}$ | | | $T_{SYML\_HE}$ | | | HE Signal B field duration |
| $N_{service}$ | | | 16 | | | Number of bits in the SERVICE field |
| $N_{tail}$ | | | 6 | | | Number of tail bits per BCC encoder |

NOTE
$N_{ST} = N_{SD} + N_{SP}$

Table 1 discloses an HE PPDU format for integrally supporting the indoor environment and the outdoor environment according to the embodiment of the present invention.

Hereinafter, L-SIG, HE-SIG A, and HE-SIG B which are disclosed signal fields may be expressed as an L-SIG field, an HE-SIG A field, and an HE-SIG B field, respectively.

Figure 2:
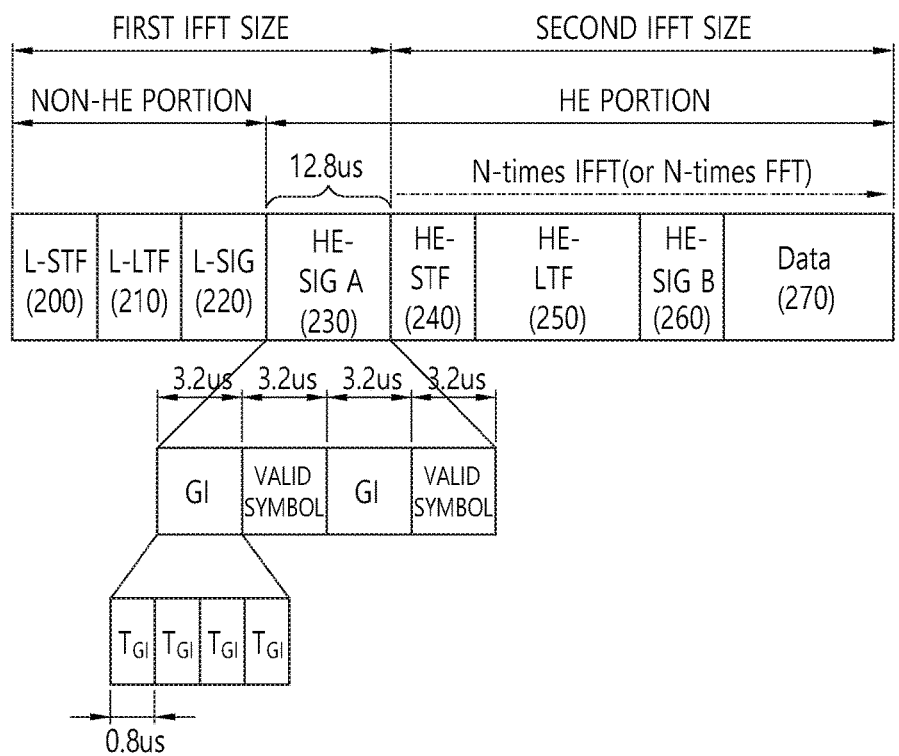
FIG. 2 is a conceptual view illustrating an HE PPDU according to an embodiment of the present invention.

FIG. 2 is a conceptual view illustrating an HE PPDU according to an embodiment of the present invention.

Referring to FIG. 2, the HE PPDU may include a non-HE portion and an HE portion.

The non-HE portion of the HE PPDU may include L-STF 200, L-LTF 210, and L-SIG 220.

The HE portion of the HE PPDU may include HE-SIG A 230, HE-STF 240, HE-LTF 250, HE-SIG B 260, and a data field 270.

The L-STF 200 may include a short training orthogonal frequency division multiplexing (OFDM) symbol. The L-STF 200 may be used for frame detection, automatic gain control (AGC), diversity detection, and coarse frequency/time synchronization.

An L-LTF 210 may include a long training orthogonal frequency division multiplexing (OFDM) symbol. The L-LTF 210 may be used for fine frequency/time synchronization and channel prediction.

An L-SIG 220 may be used for transmitting control information. The L-SIG 220 may include information regarding a data rate and a data length.

The L-STF 200, the L-LTF 210, and the L-SIG 220 included in the non-HE portion may be generated based on the first IFFT SIZE. When the HE PPDU is transmitted on the 20 MHZ bandwidth, the L-STF 200, the L-LTF 210, and the L-SIG 220 may be generated based on the 64-sized IFFT SIZE.

When the 64-sized IFFT is used on the bandwidth of 20 MHz, a subcarrier space $\Delta_F$ in the non-HE portion may be 312.5 kHz.

Each of a plurality of OFDM symbols for transmitting the HE PPDU may include the GI and a valid symbol. A total symbol duration (total symbol length) of one OFDM symbol may be a sum of a GI duration (GI length) and a valid symbol duration (valid symbol length).

When the 64-sized IFFT is used based on the 20 MHz bandwidth, a total symbol interval (or total symbol duration) $T_{SYML}$ for one OFDM symbol in the non-HE portion may 4 µs as a sum of a valid symbol duration $T_{DFT}$ (3.2 µs) and a GI duration $T_{GI}$ (0.8 µs). That is, when the GI duration is 0.8 µs, the L-STF 200, the L-LTF 210, and the L-SIG 220 may be transmitted on the OFDM symbol having the total symbol duration of 4 µs.

The HE-SIG A 230 may include common information (bandwidth (BW), GI length (or GI duration), a BSS index, cyclic redundancy check (CRC), tail bits, etc.,) for decoding the HE PPDU.

In detail, the HE-SIG A 230 may include color bits for identifying a BSS that transmitted the HE PPDU, bits indicating a total bandwidth size at which the HE PPDU is transmitted, a tail bit, a CRC bit, and the GI length.

Moreover, the HE-SIG A 230 may further include information associated with the HE-SIG B 260. For example, the HE-SIG A 230 may further include information on MCS applied to the HE-SIG B 260 and information on the number of OFDM symbols allocated for the HE-SIG B 260. In addition, the HE-SIG A 230 may also include the information on the space-time stream. For example, the information on the space-time stream may include information on the number of space-time streams used for transmission of the data field (or MAC payload) in each of a plurality of subchannels in which the HE PPDU in the MU PPDU format are transmitted.

Further, as described below, according to the embodiment of the present invention, the HE-SIG A 230 may further include resource allocation analysis information for analyzing the resource allocation information included in the HE-SIG B 260.

According to an embodiment of the present invention, the HE-SIG A 230 may be transmitted on an OFDM symbol having a GI duration that is relatively longer than the GI duration used in the non-HE portion. For example, the GI duration of the OFDM symbol for transmission of the HE-SIG A 230 may be an integral multiple (e.g., 4 times) of the GI duration used in the non-HE portion. When the GI duration of the OFDM symbol for transmission of the HE-SIG A 230 increases, a difference between the GI duration of the OFDM symbol for transmission of the HE-SIG A 230 and a GI duration of the OFDM symbol for transmission of the remaining field of the HE portion other than the HE-SIG A 230 may decrease. Therefore, a problem of a change of a retrieval range due to the change in IFFT size between the HE-SIG A 230 included in the HE PPDU and the remaining field other than the HE-SIG A 230 may be solved.

In detail, the field included in the non-HE portion and the HE-SIG A 230 included in the HE portion may be generated and transmitted based on the first IFFT size (for example, the 64-size IFFT based on the 20 MHz bandwidth) and the remaining fields included in the HE portion may be generated and transmitted based on the second IFFT size (e.g., the IFFT of 256 size based on the 20 MHz bandwidth).

If the second IFFT size is larger than the first IFFT size, the valid symbol duration ($T_{DFT\_HE}$=12.8 µs) and the GI duration ($T_{GI\_HE}$=3.2 µs=$T_{DFT\_HE}$/4) of the OFDM symbol generated based on the second IFFT size may be larger than the valid symbol duration ($T_{DFT}$=3.2 µs) and the GI duration ($T_{GI}$=0.8 µs=$T_{DFT}$/4) of the OFDM symbol generated based on the first IFFT size. For example, when the second IFFT size is 256 and the first IFFT size is 64, the GI duration (3.2 µs=$T_{DFT\_hd\_HE}$/4) of the OFDM symbol generated based on the second IFFT size may be four times longer than the GI duration (0.8 µs=$T_{DFT}$/4) of the generated OFDM symbol generated based on the first IFFT size.

As the GI duration is relatively longer, resistance to a reflected wave is stronger and resistance to noise increases. As another expression, as the GI duration becomes relatively longer, the OFDM symbol may not be interfered with a delay spread signal having a time delay with a larger value and transmission coverage of data transmitted on the corresponding OFDM symbol may increase.

That is, when the IFFT size used in each of the HE-SIG A 230 and the remaining fields in the HE portion of the HE PPDU according to the embodiment of the present invention is changed (for example, HE-SIG A 230 (the 64-sized IFFT) and the remaining fields (the 256-sized IFFT), the transmission coverage (alternatively, a detection range and detection coverage) of the HE-SIG A 230 included in the HE portion of the HE PPDU and the remaining fields may be different from each other.

Therefore, according to the embodiment of the present invention, the detection range of the HE-SIG A 230 may be corrected based on correction of the GI duration of the HE-SIG A 230 in the HE portion of the HE-PPDU. In detail, the GI duration of the HE-SIG A 230 in the HE PPDU may be corrected to a range similar to the GI duration of the remaining fields of the HE portion.

For example, the HE-SIG A 230 transmitted after the non-HE portion may be transmitted on the OFDM symbol with a total symbol duration of 6.4 μs with a GI duration of 3.2 μs and a valid symbol duration of 3.2 μs. The OFDM symbol of the total symbol duration of 6.4 μs may include the total OFDM symbol length ($T_{SYML}$ (4 μs)=$T_{DFT}$ (3.2 μs)+$T_{GI}$ (0.8 μs)) originally used for the non-HE portion and additional 3 $T_{GI}$ (2.4 μs). That is, the HE-SIG A 230 may be transmitted on the OFDM symbol having the duration of $T_{SYML}$ (4 μs)+3$T_{GI}$ (2.4 μs)=6.4 μs, which is other than the OFDM symbol having the duration of $T_{SYMBL}$ (4 μs).

When the HE-SIG A 230 is transmitted on two OFDM symbols, the HE-SIG A 230 may be transmitted on two OFDM symbols a duration of 2($T_{SYML}$ (4 μs)+3$T_{GI}$ (2.4 μs)=6.4 μs)=12.8 μs.

When the IFFT having the size which is four times larger is applied from the HE-STF 240 in the HE PPDU, the HE-STF 240 and the subsequent fields to the HE-STF 240 may be transmitted on the OFDM symbol having the total symbol duration of $T_{SYML\_HE}$ (16 μs)=$T_{DFT\_HE}$ (12.8 μs)+$T_{GI\_HE}$ (3.2 μs). That is, the GI duration (4$T_{GI}$(3.2 μs)) used for transmission of the HE-SIG A 230 may be the same as $T_{GI\_HE}$ (3.2 μs) which is the GI duration used for transmission of the remaining fields of the HE portion.

The GI duration for the OFDM symbol for transmission of the HE-SIG A is determined on the assumption that the second IFFT size applied to the subsequent field to the HE-SIG A 230 is four times larger than the first IFFT size applied to the HE-SIG A 230 and the non-HE portion.

The second IFFT size applied to the subsequent fields to the HE-SIG A 230 may be integer times (e.g., y times) larger than the first IFFT size applied to the HE-SIG A 230 and the non-HE portion. In this case, the GI duration of the OFDM symbol for transmission of the HE-SIG A 230 may vary according to the y value. That is, additionally, (y−1)$T_{GI}$ may be used for correction of the GI duration of the OFDM symbol transmitting the HE-SIG A 230. If y is 4 as described above, the additional 3$T_{GI}$ may be used for correction of the GI duration.

When the IFFT size applied to the subsequent fields to the HE-SIG A 230 may be integer times (e.g., y times) larger than the IFFT size applied to the HE-SIG A 230 and the non-HE portion, the transmission duration of the HE-SIG A 230 may be expressed as shown in Equation 1 given below.

$$x \times (T_{SYML}+(y-1) \times T_{GI}) \qquad \text{<Equation 1>}$$

Where, x may indicate the number of OFDM symbols for transmission of the HE-SIG A 230 and y may indicate how many times the second IFFT size used in the remaining fields other than the HE -SIG A 230 in the HE portion is larger than the first IFFT size used in the non-HE portion and the HE-SIG A 230.

(Y−1)$T_{GI}$ indicating the additional GI duration used for transmission of the HE-SIG A 230 may be set to different values depending on a system performance margin. When the GI duration is longer, degradation of the symbol energy is large, and the number of resources for data transmission as many as the corresponding increased GI duration may decrease. Thus, the (y−1)$T_{GI}$ representing the additional GI duration may be set to $T_{GI}$ to (y−1)$T_{GI}$ according to the system performance margin.

The HE-SIG B 260 may include information for each of a plurality of STAs which will receive the HE PPDU (alternatively, the HE PPDU in the MU PPDU format). For example, the HE-SIG B 260 may include identification information (e.g., partial association identifier (PAID) and group identifier (GID)) of the plurality of STAs which will receive the HE PPDU.

In addition, the HE-SIG B 260 may include information on a resource allocated to each of the plurality of STAs which will receive the HE PPDU (alternatively, the HE PPDU in the MU PPDU format). In detail, the HE-SIG B 260 may include OFDMA-based resource allocation information (alternatively, MU-MIMO information) for each of a plurality of STAs which will receive the HE PPDU of the MU PPDU format. For example, the HE-SIG B may include information on an allocation sub channel and/or allocation time-space stream of fields (e.g., the HE-STF 240, the HE-LTF 250, and the data field (or MAC payload) 270) after the HE-SIG B. Further, the HE-SIG B 260 may include information for decoding the data field (or the MAC payload). The information for decoding the data field may include MCS, Coding, space time block coding (STBC), transmit beamforming (TXBF), and the like.

The HE-STF 240 may be used for improving automatic gain control estimation in a multiple input multiple output (MIMO) environment or an OFDMA environment. In detail, the HE-STF 240 may be used for automatic gain control estimation and channel estimation for decoding a subsequent field transmitted in a channel which is the same as the sub channel in which the HE-STF 240 is transmitted.

The HE-LTF 250 may be used for estimating a channel in the MIMO environment or the OFDMA environment. In detail, the HE-STF 250 may be used for channel estimation for decoding a subsequent field transmitted in a channel which is the same as the sub channel in which the HE-LTF 250 is transmitted.

The data field 270 may include data to be transmitted to the receiving STA. The data field 270 may include an MAC header and an MSDU (or MAC body). The MAC header includes a duration/ID field including information on time resources for the HE PPDU transmission procedure, an identifier of the transmitting STA that transmits the MAC payload (or frame), the identifier of the receiving STA that will receive the MAC payload (or frame), and the like. The MSDU may include downlink data to be transmitted to the receiving STA pended to the transmitting STA.

The PPDU disclosed in FIG. 2 may be expressed as follows.

The transmitting STA generates the PPDU and the transmitting STA transmits the PPDU to at least one receiving STA, herein, the PPDU may sequentially include a first signal field (e.g., L-SIG), a second signal field (e.g., HE-SIG), and a training field (e.g., HE-STF). The first signal field may be generated based on the first inverse fast Fourier transform (IFFT) size and transmitted on a first orthogonal frequency division multiplexing (OFDM) symbol, the second signal field may be generated based on the first IFFT size and transmitted on a second OFDM symbol, and the training field may be generated based on the second IFFT size and transmitted on a third OFDM symbol. The second IFFT size may be integral times larger than the first IFFT size. The total symbol duration of the first OFDM symbol may include a first GI duration determined based on the first IFFT size and a first valid symbol duration determined based on the first IFFT size. The total symbol duration of the second OFDM symbol may include a second GI duration which is integer times larger than the first GI duration and the first valid symbol duration. The total symbol duration of the third OFDM symbol may include a third GI duration determined based on the second IFFT size and a second valid symbol duration determined based on the second IFFT size.

In this case, the first IFFT size may be 64, the second IFFT size may be 256, the first GI duration may be 0.8 μs, the second GI duration may be 3.2 μs, the third GI duration is 3.2 μs, the first valid symbol duration may be 3.2 μs, and the second valid symbol duration may be 12.8 μs.

Figure 3:
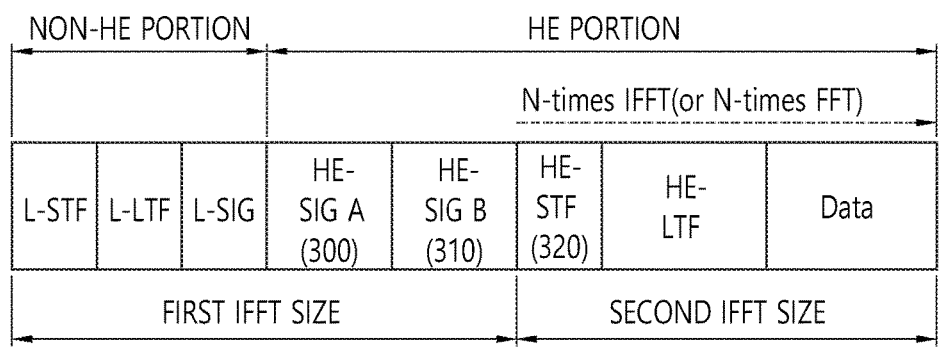
FIG. 3 is a conceptual view illustrating an HE PPDU according to an embodiment of the present invention.

FIG. 3 is a conceptual view illustrating an HE PPDU according to an embodiment of the present invention.

In FIG. 3, an HE PPDU in which the position of the HE-SIG B 310 is changed after the HE-SIG A 300 is disclosed. Information included in each field of the HE PPDU disclosed in FIG. 3 may be the same as the information included in each field of the HE PPDU in FIG. 2.

Referring to FIG. 3, HE-SIG B 310 may be positioned before HE-STF 320 after HE-SIG A 300 on the HE portion.

The HE-SIG B 310 may be generated based on the first IFFT size (e.g., 64-sized IFFT) similarly to the HE SIG A 300 and the non-HE portion. The HE-STF 320 positioned after the HE-SIG B 310 and a field after the HE-STF 320 may be generated based on the second IFFT size (e.g., IFFT having the 256 size which is four times larger than the first IFFT size).

In this case, the OFDM symbol for transmission of the HE-SIG A 310 may include $(y-1)T_{GI}$ which is the additional GI duration. Similarly, the additional GI duration may be changed to $T_{GI}$ to $(y-1)T_{GI}$ according to the system performance margin.

When the additional GI durations for transmission of the HE-SIG A 300 and the HE-SIG B 310 are used, a difference between the detection range of the remaining fields of the HE portion transmitted after the HE-SIG A 300 and the HE-SIG B 310 and the detection range of the HE-SIG A 300 and the HE-SIG B 310 may decrease.

Transmission and reception of the PPDU disclosed in FIG. 3 may be expressed as follows.

The PPDU may further include a third signal field (e.g. HE-SIG B) positioned between the second signal field (e.g. HE-SIG A) and the training field (e.g. HE-STF), the third signal field may be generated based on the first IFFT size and transmitted on a fourth OFDM symbol, and the total symbol duration of the fourth OFDM symbol may include the second GI duration and the first valid symbol duration. In this case, the first IFFT size may be 64, the second GI duration may be 3.2 μs, and the first valid symbol duration may be 3.2 μs.

Figure 4:
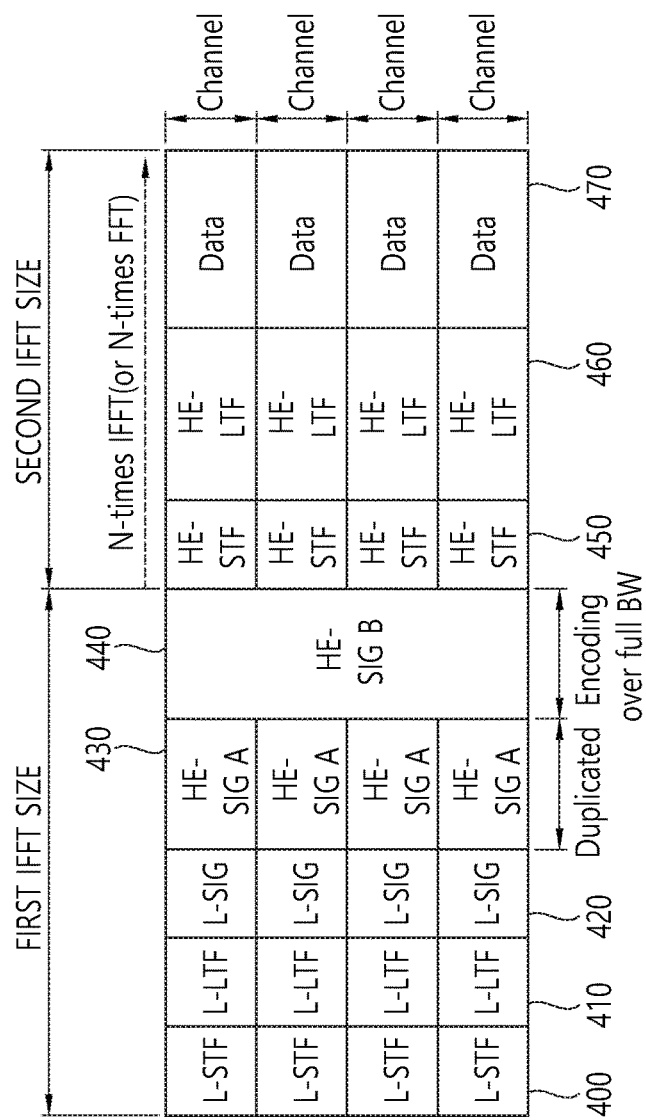
FIG. 4 is a conceptual view illustrating an HE PPDU according to an embodiment of the present invention.

FIG. 4 is a conceptual view illustrating an HE PPDU according to an embodiment of the present invention.

In FIG. 4, the HE PPDU of the MU PPDU format is disclosed.

Referring to FIG. 4, L-STF 400, L-LTF 410, L-SIG 420, and HE-SIG A 430 in the HE PPDU of the MU PPDU format may be encoded per channel. The HE-SIG A 430 encoded per channel may be transmitted in a duplicate format on the entire bandwidth.

The receiving STA of the MU PPDU may not know the bandwidth information of the HE portion transmitted after the non-HE portion. Accordingly, the HE-SIG A 430 may be generated and transmitted in the duplicate format and the HE-SIG A 430 may include bandwidth information for the HE portion.

As described above, the HE-SIG A 430 may include the bandwidth information of the HE PPDU, information on the GI applied to the HE-SIG B 440 and/or the data field, and information related to the HE-SIG B 440 (e.g., HE-SIG B structure information, HE-SIG B size information, and the like).

The duplicate format may be generated based on replication or duplication of a field transmitted on a specific band. When the duplicate format is used, the field of the specific band is replicated or duplicated, and the replicated or duplicated field may be transmitted on a plurality of bands.

When the total bandwidth through which the MU PPDU is transmitted includes a plurality of channels, the L-STF 400, the L-LTF 410, and the L-SIG 420 encoded per channel may be transmitted on each of the plurality of channels. When the total bandwidth allocated to the MU PPDU includes the plurality of channels, the HE-SIG A 430 encoded per channel is duplicated to be transmitted on each of the plurality of channels in the duplicate format.

The HE-SIG B 440 may be encoded and transmitted on the total band allocated to the MU PPDU. For example, when the total band allocated to the MU PPDU is 80 MHz, the HE-SIG B 440 may be encoded and transmitted in the 80 MHz band. The HE-SIG B 440 may be encoded and transmitted per subband or generated and transmitted in the duplicate format per subband.

HE-STF 450, HE-LTF 460, and a data field 470 may be encoded and transmitted on a frequency resource (e.g., a subband) allocated to each of a plurality of receiving STAs receiving data. The sub-band, which is an encoding unit of the HE-STF 450, the HE-LTF 460, and the data field 470, may be the same unit as the channel or may be a unit included in the channel. For example, the channel may have a bandwidth size of 20 MHz and the subband may have a bandwidth size of 10 MHz (or the bandwidth size of 20 MHz). Hereinafter, a case where the subband and the channel have the same bandwidth size is assumed.

Hereinafter, in the embodiment of the present invention, for convenience of description, it may be assumed that the AP transmits the DL MU PPDU to STA1, STA2, STA3, and STA4, and subband 1, subband 2, subband 3 and subband 4 are allocated to STA1, STA2, STA3 and STA4 respectively in order to receive downlink data pended through the DL MU PPDU. In this case, the HE-STF, the HE-LTF, and the data field are encoded in each of subband 1, subband 2, subband 3, and subband 4 to be transmitted to each of STA1 to STA4.

A process in which the STA receives the DL MU PPDU transmitted by the AP may be performed as follows. For example, the STA1 may receive the L-STF 400, the L-LTF 410, the L-SIG 420, and the HE-SIG A 430 through at least one channel of channels 1 to 4 receiving the DL MU PPDU. The L-STF 400 and the L-LTF 410 may be used for decoding the following fields L-SIG 420, the HE-SIG A 430, and the HE-SIG B 440. The STA1 may obtain information on the total bandwidth (for example, 80 MHz) through which the HE-SIG B 440 is transmitted based on the bandwidth information included in the HE-SIG A 430 and decode the HE-SIG B 440 transmitted on the total bandwidth. The STA1 may obtain information on a frequency resource (e.g., subband 1) allocated to the STA1 included in the HE-SIG B 440 and receive the HE -STF 450, the HE-LTF 460, and the data field 470 transmitted on the allocated frequency resource (e.g., subband 1).

The HE-STF 450 and the HE-LTF 460 may be used for channel estimation for decoding the data field 470.

As described above, the HE-SIG B 440 may include information (e.g., MIMO information used for data transmission, MCS information of data, coding information of data, the GI duration information of the OFDM symbol for transmission of the data field (alternatively, a field included in the HE portion transmitted after the HE-SIG B 440), and the like) related to decoding of data transmitted to the receiving STA.

In particular, the HE-SIG B 440 may include resource allocation information for DL MU OFDMA transmission as described above. For example, the resource allocation information may include identification information of the receiving STA which will receive the DL MU PPDU, information (e.g., the number of subbands allocated to each receiving STA) on resources allocated to each receiving STA, and the like. The size of the resource allocation information may be variable according to the number of receiving STAs and the subbands allocated to the receiving STAs. Therefore, the length of the HE-SIG B 440 (alternatively, the number of OFDM symbols or the number of bits used for transmission of the HE-SIG B 440) may be variable according to the number of receiving STAs and the number of subbands allocated to each receiving STA.

According to the embodiment of the present invention, the HE-SIG A 430 may include the resource allocation analysis information as information for reducing decoding complexity of the resource allocation information included in the HE-SIG B 440. For example, the resource allocation analysis information included in the HE-SIG A 430 may include information on the total number of receiving STAs, information on the maximum number (or size) of subbands allocable to the receiving STA, information on a subband indication method, information on the position (allocated subband boundary) of a subband that is changed from the subband allocated for a specific receiving STA to the allocated subband for another receiving STA, and the like.

That is, the HE PPDU may have a hierarchical SIG structure in which decoding of the resource allocation information included in the HE-SIG B 440 is performed based on the resource allocation analysis information included in the HE-SIG A 430.

As another expression, the third signal field (e.g., HE-SIG B) may include the resource allocation information and the resource allocation information may include the information on the number of subbands allocated to each of one or more receiving STAs. The second signal field (e.g., HE-SIG A) may include the resource allocation analysis information for analyzing the resource allocation information and the resource allocation analysis information may include the information on the maximum number of subbands allocable to each of one or more STAs.

Figure 5:
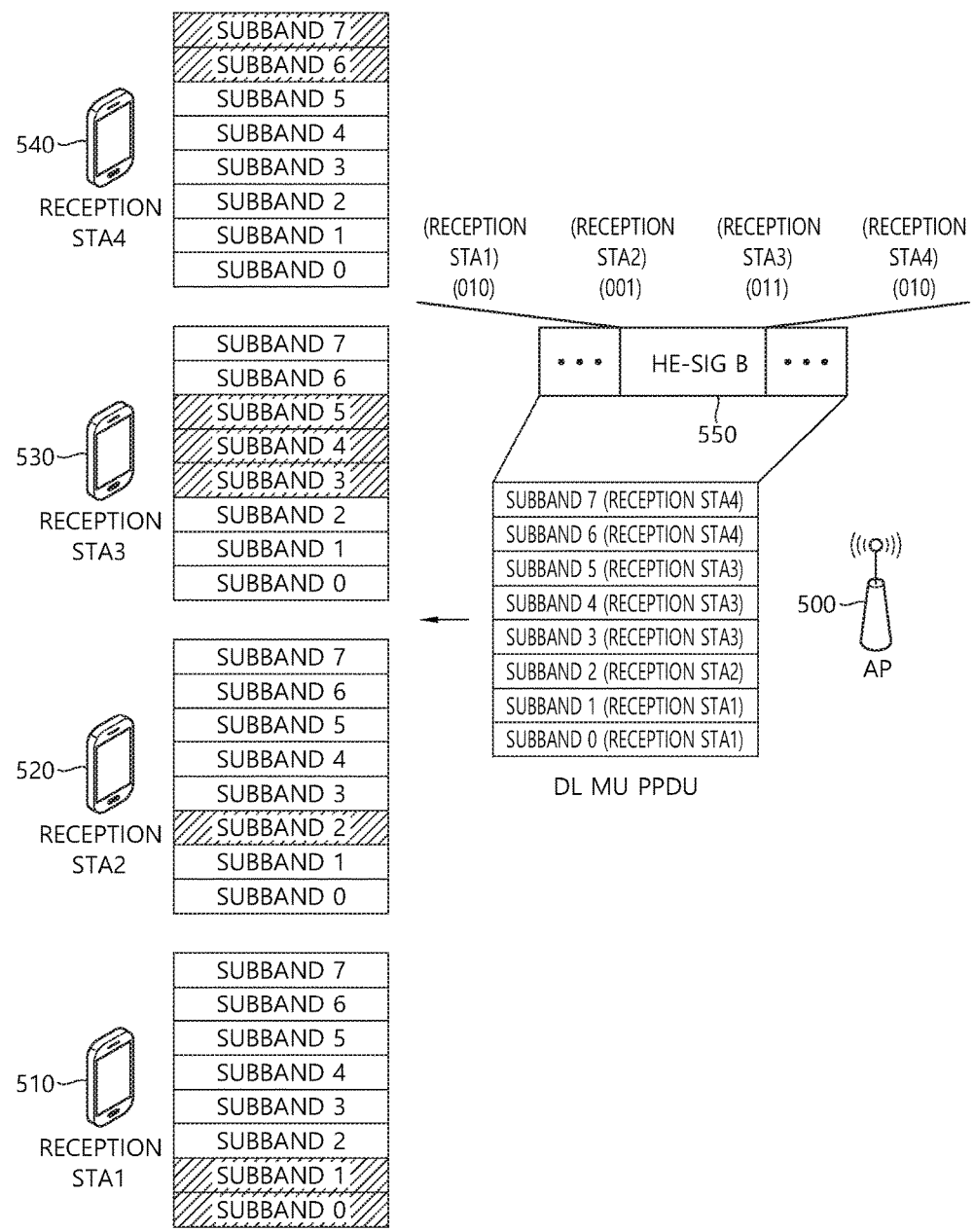
FIG. 5 is a conceptual view illustrating a method for allocating a subband to a receiving STA according to an embodiment of the present invention.

FIG. 5 is a conceptual view illustrating a method for allocating a subband to a receiving STA according to an embodiment of the present invention.

In FIG. 5, it is assumed that the DL MU PPDU is transmitted to four receiving STAs on eight subbands. In particular, in FIG. 5, disclosed is a resource allocation method for continuously allocating eight respective subbands to four respective receiving STAs.

Referring to FIG. 5, assumed is that the AP 500 configures the frequency resources for downlink data transmission to receiving STA1 510 as subband 0 and the subband 1, the frequency resources for the downlink data transmission to receiving STA2 520 as subband 2, the frequency resources for the downlink data transmission to receiving STA3 530 as subband 3, subband 4, and subband 5, and the frequency resources for the downlink data transmission to receiving STA4 540 as subband 6 and subband 7.

According to the embodiment of the present invention, for the resource allocation based on only the information on the number of subbands allocated to each of the plurality of receiving STAs, an allocation order of the plurality of receiving STAs to the plurality of respective subbands included in the total bandwidth may be predetermined.

For example, the lowest subband of the lowest index channel of the total bandwidth may be indexed with subband 0 and an index may be assigned to each of the plurality of subbands included in the total bandwidth based on sequential indexing. When such an indexing method is used, the highest subband of the highest index channel of the total bandwidth may be indexed with subband max-1. Herein, max may represent the total number of subbands included in the total bandwidth. A relatively low index may be given to a channel and a subband allocated to a relatively low frequency band in the total bandwidth and a relatively high index may be given to a channel and a subband allocated to a relatively high frequency band in the total bandwidth.

The plurality of receiving STAs may be sequentially allocated with subbands given with indexes based on indexes (alternatively, identification information) (for example, an association identifier (AID), a partial association identifier (PAID), etc.,) allocated to the plurality of receiving STAs. For example, the receiving STA1 510 having the lowest index among the plurality of receiving STAs may be continuously allocated with subbands having high indexes from the subband corresponding to the lowest index based on the number of subbands allocated to the receiving STA1 510. Among the plurality of receiving STAs, the receiving STA2 520 having the lowest index next to the receiving STA1 510 may be continuously allocated with the high indexes from the subband corresponding to the lowest index except for the subbands allocated to the receiving STA1 510.

HE-SIG B 550 may include the information on the number of subbands allocated to each of the receiving STA1 to the receiving STA4 and information on the number of subbands allocated to the receiving STA1 to the receiving STA4 may indicate the subband allocated to each of the receiving STA1 to the receiving STA4.

For example, the resource allocation information included in the HE-SIG B 550 may indicate the number of subbands allocated to each of the plurality of receiving STAs based on 3 bits allocated to each of the plurality of receiving STAs. As described above, the subband allocation order of each of the plurality of receiving STAs may be predetermined, and when there is only the information on the number of subbands allocated to each of the plurality of receiving STAs, each of the plurality of subbands included in the total bandwidth may be sequentially allocated to each of the plurality of receiving STAs according to the allocation order of the subbands of the plurality of receiving STAs. That is, based on the information on the number of subbands allocated to each of the plurality of receiving STAs, each of the plurality of subbands included in the total bandwidth may be sequentially (for example, from a subband having a low index to a subband of a high index) allocated to each of the plurality of receiving STAs.

It may be assumed that each of the plurality of subbands included in the total bandwidth is sequentially transmitted to the receiving STA1 510, the receiving STA2 520, the receiving STA3 530, and the receiving STA4 540 in order of the receiving STA1 510, the receiving STA2 520, the receiving STA3 530, and the receiving STA4 540, respectively.

The resource allocation information of the HE-SIG B may include 12 bits '(010)(001)(011)(010)' for indicating resource allocation to the receiving STA1 510, the receiving STA2 520, the receiving STA3 530, and the receiving STA4

540. That is, the 12-bit resource allocation information may correspond to the information (receiving STA1: 2, receiving STA2: 1, receiving STA3: 3, and receiving STA4: 2) on the number of subbands allocated to each of the plurality of receiving STAs by 3 bits.

That is, the total bits constituting the resource allocation information may include the information on the number of subbands sequentially allocated to the plurality of respective receiving STAs in accordance with the order of the indexes (alternatively, the identification information) of the plurality of receiving STAs. For example, bits corresponding to MSB, MSB-1, and MSB-2 among all bits may correspond to the information on the number of subbands allocated to a receiving STA (for example, receiving STA1 510) having the lowest index among the plurality of receiving STAs. On the contrary, bits corresponding to LSB+2, LSB+1, and LSB among all bits may correspond to the information on the number of subbands allocated to a receiving STA (for example, receiving STA4 540) having the highest index among the plurality of receiving STAs.

In this case, eight subbands (subband 0 to subband 7) included in the total bandwidth may be allocated to the receiving STA1 510 (two, subband 0 and subband 1), the receiving STA2 520 (one, subband 2), the receiving STA3 530 (three, subband 3, subband 4, and subband 5), and the receiving STA4 540 (2, subband 6 and subband 7) in the order of the receiving STA1 510, the receiving STA2 520, the receiving STA3 530, and the receiving STA4 540.

When the number of receiving STAs capable of DL MU transmission is x, the number of bits allocated to the resource allocation information for the receiving STA (alternatively, an indexing bit size for resource allocation) may be 3×(3*x).

Figure 6:
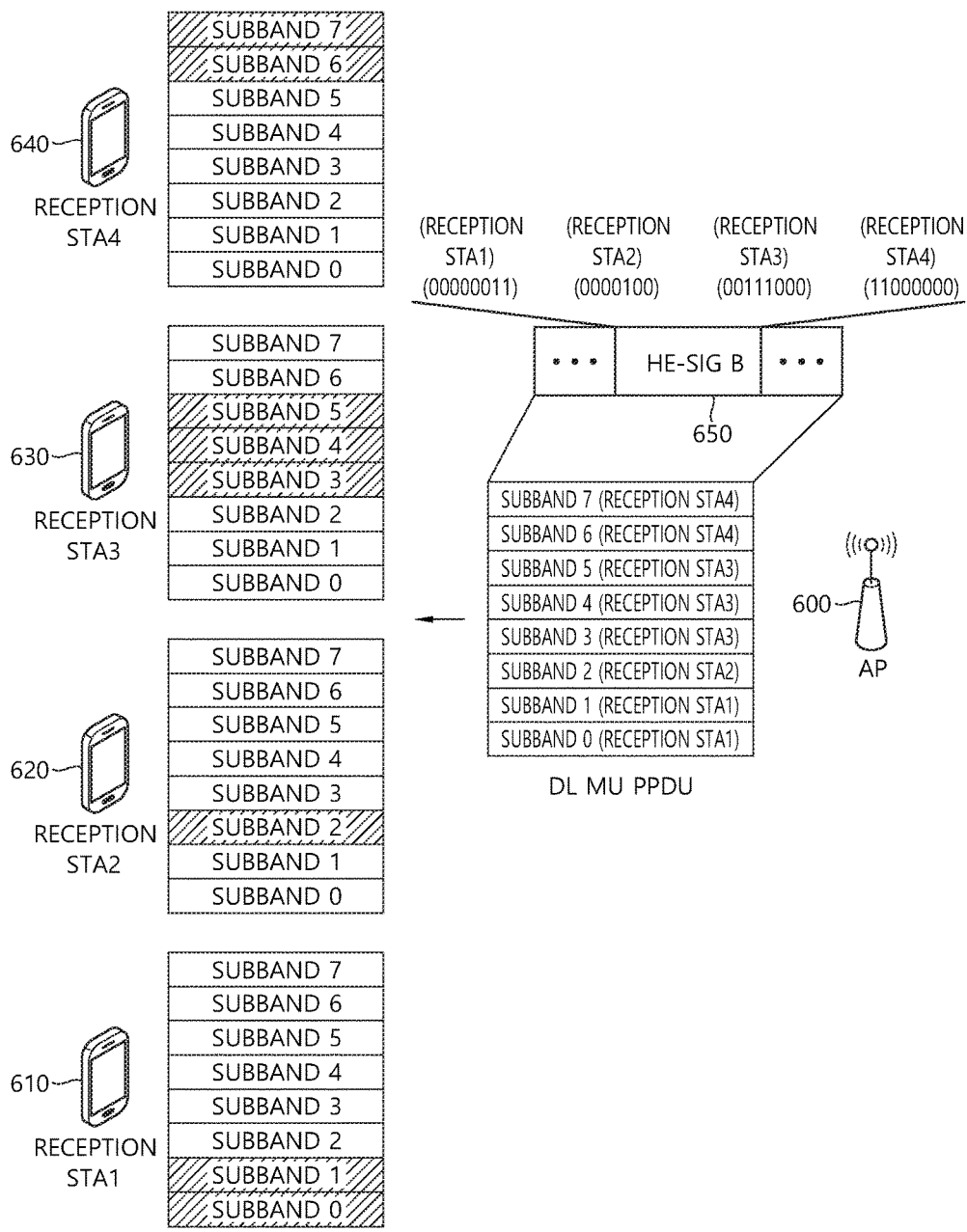
FIG. 6 is a conceptual view illustrating a method for allocating a subband to a receiving STA according to an embodiment of the present invention.

FIG. 6 is a conceptual view illustrating a method for allocating a subband to a receiving STA according to an embodiment of the present invention.

In FIG. 6, it is assumed that the DL MU PPDU is transmitted to four receiving STAs on eight subbands. In particular, in FIG. 6, disclosed is a resource allocation method for discontinuously allocating eight respective subbands to four respective receiving STAs.

Referring to FIG. 6, assumed is that the AP 600 configures the frequency resources for downlink data reception to receiving STA1 610 as subband 0 and the subband 1, the frequency resources for the downlink data reception to receiving STA2 620 as subband 2, the frequency resources for the downlink data reception to receiving STA3 630 as subband 3, subband 4, and subband 5, and the frequency resources for the downlink data reception to receiving STA4 640 as subband 6 and subband 7.

When the method of discontinuously allocating the subbands is supported, a bitmap may be used, for allocating the indexes of the plurality of respective subbands to each receiving STA.

For example, HE-SIG B 650 may include the resource allocation information indicating the subbands allocated to the plurality of respective receiving STAs based on 8 bits allocated to the plurality of respective receiving STAs. The resource allocation information indicating the subbands allocated to the plurality of respective receiving STAs may include bits indicating information on at least one subband on the total bandwidth allocated to the plurality of respective STAs sequentially on the basis of the index information of the plurality of receiving STAs. The resource allocation information may include bits indicating the information on at least one subband on the total bandwidth, which is allocated to each of the receiving STA1 610, the receiving STA2 620, the receiving STA3 630, and the receiving STA4 640 in order of the receiving STA1 610, the receiving STA2 620, the receiving STA3 630, and the receiving STA4 640, respectively. In the case of FIG. 6, the resource allocation information may indicate the information on the subbands allocated to each of the receiving STA1 610 to the receiving STA4 640 by allocating 8 bits to each of the receiving STA1 610 to the receiving STA4 640 as (00000011), (00000100), (00111000), and (11000000), respectively. The LSB of 8 bits allocated to the receiving STA may correspond to a subband having the lowest index and the MSB may correspond to a subband having the highest index.

Figure 7:
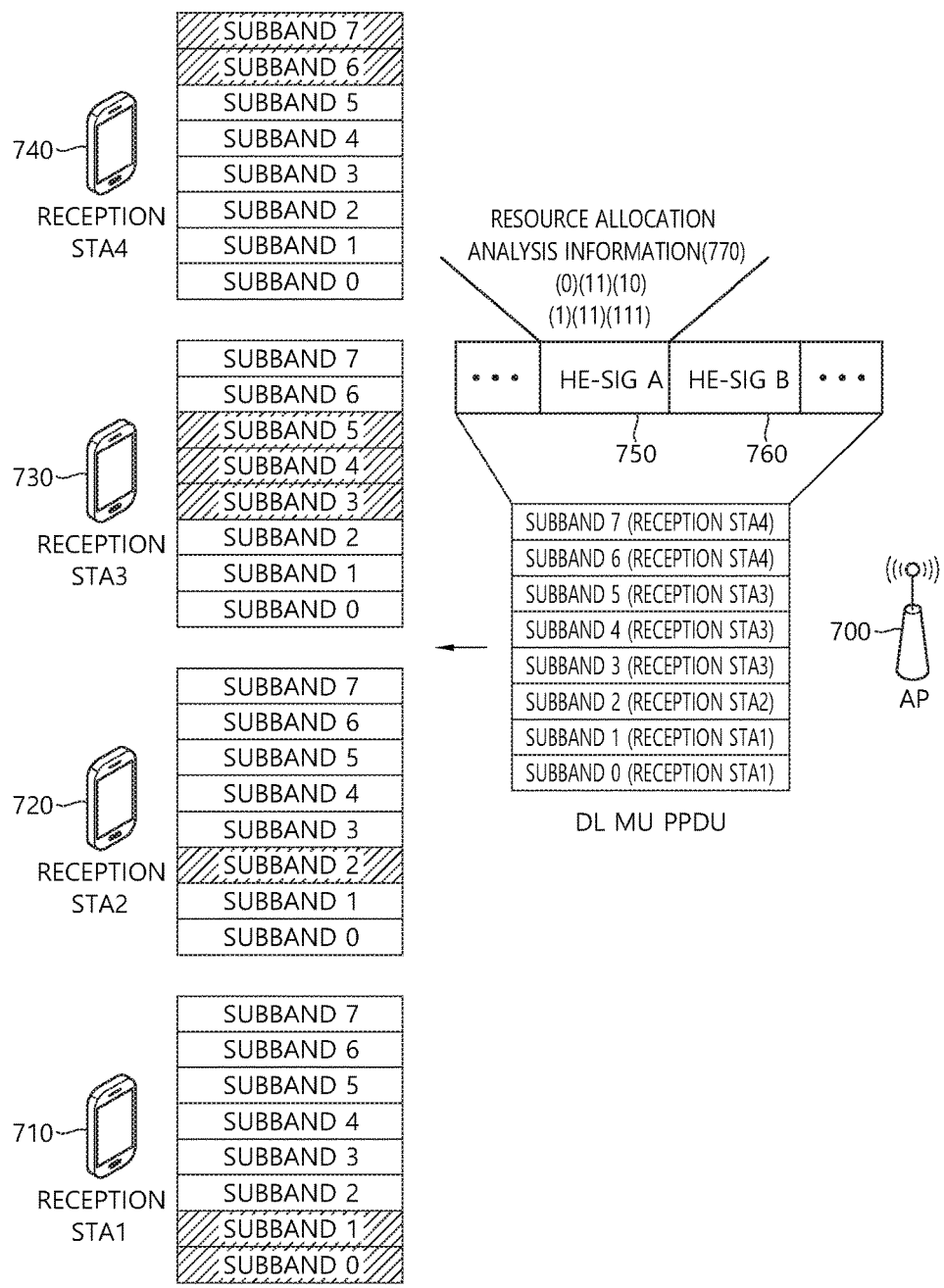
FIG. 7 is a conceptual view illustrating HE-SIG A according to an embodiment of the present invention.

FIG. 7 is a conceptual view illustrating HE-SIG A according to an embodiment of the present invention.

In FIG. 7, disclosed is a method for transmitting the resource allocation analysis information which is information for analyzing the resource allocation information included in HE-SIG B 760 through HE-SIG A 750. Each of the HE-SIG A 750 and the HE-SIG B 760 may be a separate signal field, but the HE-SIG A 750 may be analyzed as a specific portion of the HE-SIG B 760 which is separated from the HE-SIG B 760 and encoded. For example, the HE-SIG A 750 may be analyzed as a separate HE-SIG B block including the resource allocation analysis information which is information for the analysis of the resource allocation information included in the HE-SIG B 760.

Referring to FIG. 7, for example, the resource allocation analysis information 770 included in the HE-SIG A 750 may include at least one information of information on a resource allocation scheme (alternatively, an indication scheme for allocating resources), information on the number of receiving STAs, and information on the maximum number of subbands allocable to each receiving STA.

When the allocation of the subbands to receiving STA1 to receiving STA4 740 is performed as illustrated in FIG. 5, the resource allocation analysis information 770 of the HE-SIG A 750 may be (0)(11)(10) as information of 5 bits. (0) which is a first bit of 5 bits may be information indicating the use of the continuous resource allocation scheme disclosed in FIG. 5, and (11) and (0~3) which are a second bit and a third bit among 5 bits may be information indicating resource allocation to four receiving STAs, and (10) and (0~2) which are a fourth bit and a fifth bit among 5 bits may be information indicating the maximum number (3) of subbands allocable to one receiving STA.

As another example, when the allocation of the subbands to the receiving STA1 710 to the receiving STA4 740 is performed as illustrated in FIG. 6, the resource allocation analysis information 770 of the HE-SIG A 750 may be (1)(11)(111) as information of 6 bits. (1) which is the first bit of 6 bits may be information indicating the use of the continuous resource allocation scheme disclosed in FIG. 6, and (11) and (0~3) which are the second bit and the third bit among 6 bits may be information indicating resource allocation to four receiving STAs, and (111) which is the fourth bit, the fifth bit, and a sixth bit among 6 bits may be information indicating the maximum number (3) of subbands allocable to one receiving STA.

According to the embodiment of the present invention, in order to reduce overhead of the bits allocated to the resource allocation information 770 of the HE-SIG B 760, the resources allocated to each of the plurality of receiving STAs may be indicated based on a combination of the information on the number of receiving STAs and the information on the number of subbands.

When at least four subbands of eight subbands are allocated to four receiving STAs, respectively, indexes for resource allocation may be allocated as shown in Table 2 given below.

TABLE 2

| Resource allocation index | # of subbands of User1 (receiving STA1) | # of subbands of User2 (receiving STA2) | # of subbands of User3 (receiving STA3) | # of subbands of User4 (receiving STA4) |
|---|---|---|---|---|
| 0 | 1 | 1 | 1 | 1 |
| 1 | 2 | 1 | 1 | 1 |
| 2 | 3 | 1 | 1 | 1 |
| 3 | ... | ... | ... | ... |
| 4 | 2 | 1 | 3 | 2 |
| 5 |   |   |   |   |
| 6 |   |   |   |   |
| 7 |   |   |   |   |

Information indicating one resource allocation index of eight resource allocation indexes may be included in the resource allocation information of the HE-SIG B. Three bits may be used, to indicate one resource allocation index of eight resource allocation indexes. In the case of FIGS. 5 and 6, '100' which is bits indicating resource allocation index 4 may be included in the resource allocation information. There may be various combinations depending on the number of subbands and the number of receiving STAs, and the sizes of the bits allocated for the resource allocation index may vary. For example, when 16 resource allocation indexes corresponding to 16 resource allocation combinations are defined, 4 bits may be allocated to indicate one resource allocation index among 16 resource allocation indexes.

Figure 8:
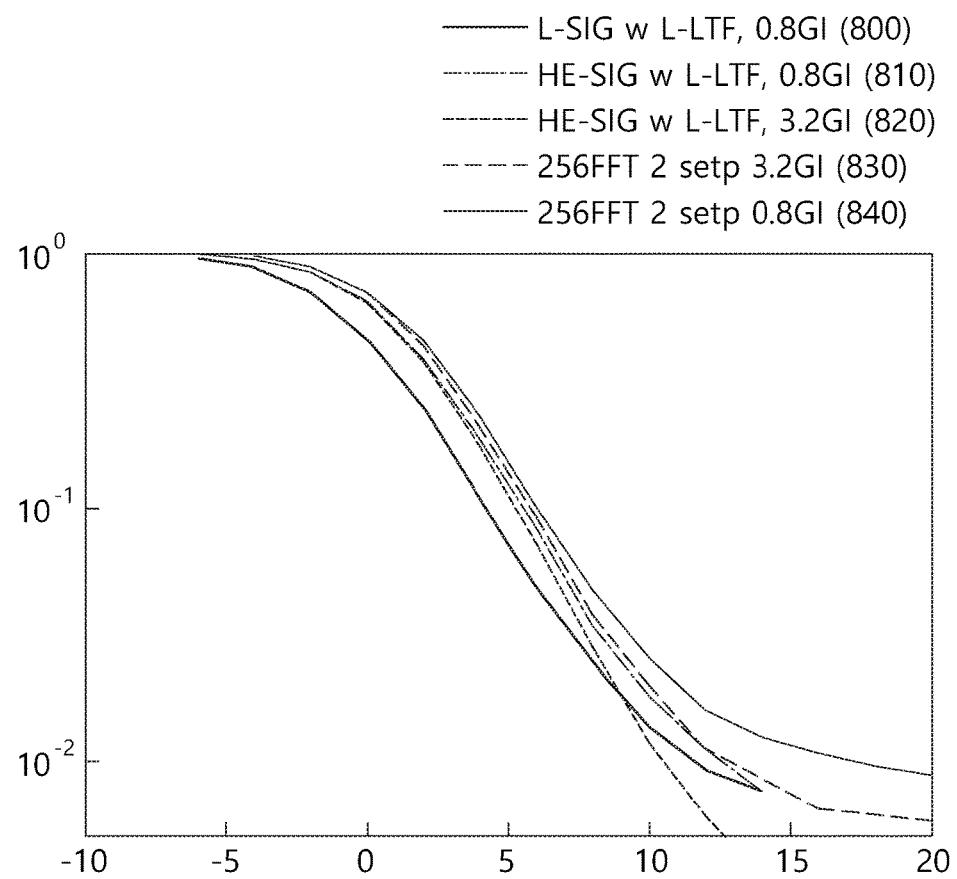
FIG. 8 is a graph illustrating an experimental result of transmission of an HE PPDU according to an embodiment of the present invention.

FIG. 8 is a graph illustrating an experimental result of transmission of an HE PPDU according to an embodiment of the present invention.

Referring to FIG. 8, L-SIG w L-LTF 0.8GI 800 shows L-SIG performance in which channel estimation is performed with L-LTF. The L-SIG may be transmitted on an OFDM symbol including a GI of 0.8 μs based on 64 FFT.

HE-SIG w L-LTF 0.8GI 810 shows HE-SIG performance in which the channel estimation is performed with the L-LTF. The L-SIG may be transmitted on the OFDM symbol including the GI of 0.8 μs based on 64 FFT.

HE-SIG w L-LTF 3.2GI 820 shows the HE-SIG performance in which the channel estimation is performed with the L-LTF. The HE-SIG may be transmitted on the OFDM symbol including the GI of 3.2 μs based on 64 FFT.

256FFT 2step 3.2GI 830 shows the performance of the HE-SIG in which the channel estimation is performed by applying 256FFT to HE-STF, but not allocating a signal at all tones but allocating the signal at an interval of 2 tones when assuming that HE-STF comes before the HE-SIG. The HE-SIG may be transmitted on the OFDM symbol including the GI of 3.2 μs.

256FFT 2step 0.8GI 840 is the same as the 256FFT 2step 3.2GI 830, but shows the performance of HE-SIG when the GI of 0.8 μs is used. The HE-SIG may be transmitted on the OFDM symbol including the GI of 0.8 μs.

Referring to the result shown in FIG. 8, the GI of 3.2 μs, which is four times larger than the GI of 0.8 μs in HE-SIG performance, shows a more robust frame error rate (FER) result in an outdoor channel environment. The detection range needs to be adjusted to the detection range of the longer CP applied to the HE portion in which the 4-times FFT is used in order to make the PPDU format to more robustly perform SIG detection in the outdoor environment.

Figure 9:
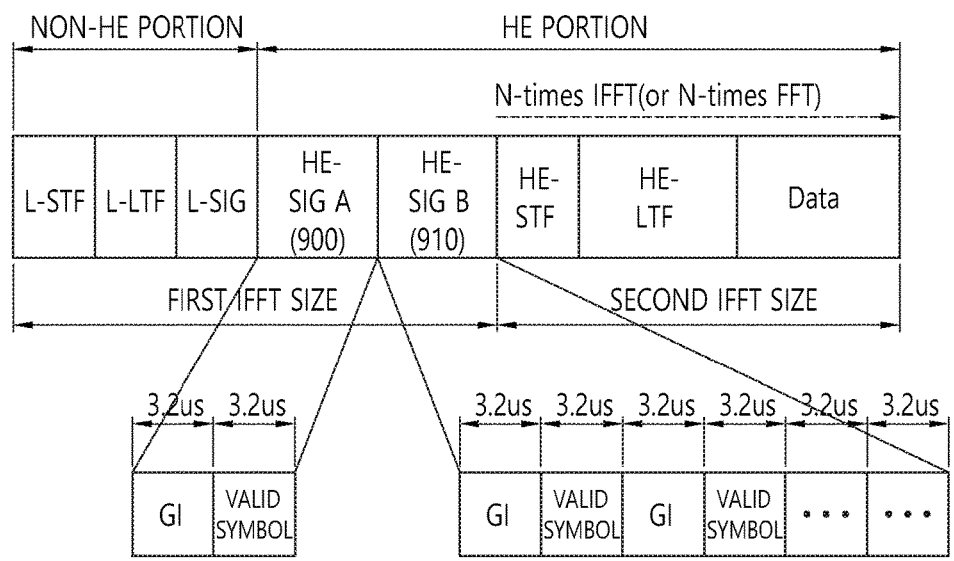
FIG. 9 is a conceptual view illustrating an HE PPDU according to an embodiment of the present invention.
Figure 9:
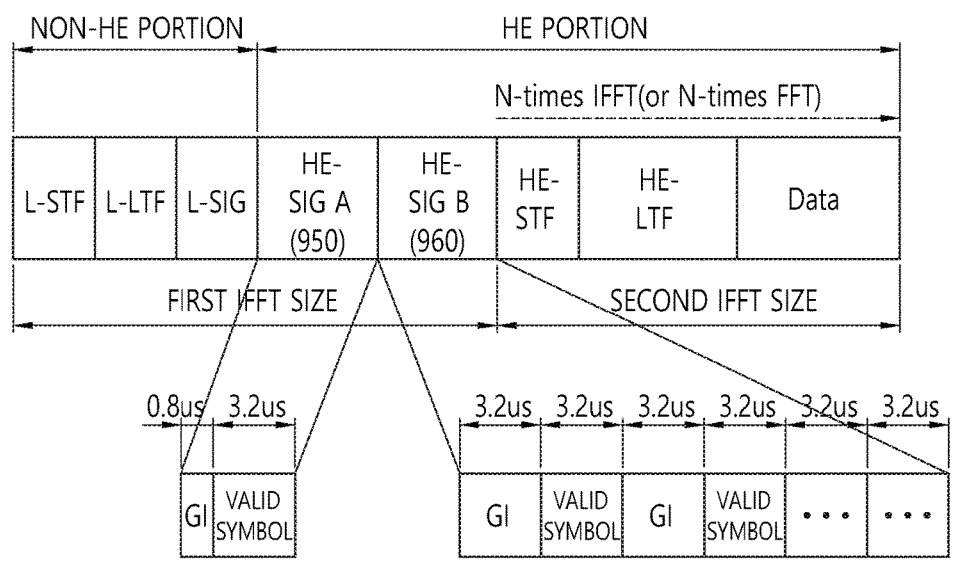

FIG. 9 is a conceptual view illustrating an HE PPDU according to an embodiment of the present invention.

In FIG. 9, a normal GI (alternatively, a normal CP) may indicate a GI used in a non-HE portion (or L-SIG portion). A longer GI may indicate a GI having a GI duration that is a multiple of the GI duration of the normal GI. The long GI corresponds to a 4-times IFFT size corresponding to the HE portion of the HE PPDU and thus has the GI duration that is four times longer than the GI duration of the normal GI.

Referring to an upper part of FIG. 9, HE-SIG A 900 and HE-SIG B 910 included in the HE PPDU may be transmitted on the OFDM symbol having the longer GI.

The HE-SIG A 900, the HE-SIG B 910, and the non-HE portion may be generated based on the first IFFT size and the HE portion other than the HE-SIG A 900 and the HE-SI B 910 may be generated based on the second IFFT size. The second IFFT size may be four times larger than the first IFFT size.

The HE-SIG A 900 and the HE-SIG B 910 included in the HE portion may be transmitted on the OFDM symbol having the longer GI in order to adjust the detection range of the field included in the HE portion.

In the HE PPDU, the HE-SIG A 900 may be transmitted on one OFDM symbol and the HE-SIG B 910 may be transmitted on the plurality of OFDM symbols. The total symbol duration of the individual OFDM symbols for transmission of the HE-SIG A 900 and the HE-SIG B 910 may be 6.4 μs. The total symbol duration of 6.4 μs may include a GI duration of 3.2 μs and a valid symbol duration of 3.2 μs. In this case, the HE-SIG A 900 may have a transmission duration of 6.4 μs and the HE-SIG B 910 may have a transmission duration of x*6.4 μs. x represents the number of OFDM symbols allocated to the HE-SIG B 910.

The HE-SIG B 910 may be transmitted on a fixed number of, i.e., two or three OFDM symbols. The number of OFDM symbols for transmission of the HE-SIG B 910 may be determined dependently based on the size of the total bandwidth for transmission of the HE-SIG B 910.

Referring to a lower part of FIG. 9, HE-SIG A 950 included in the HE PPDU may be transmitted on the OFDM symbol having the normal GI and HE-SIG B 960 may be transmitted on the OFDM symbol having the longer GI.

In the STA or AP, an auto detection rule based on constellation rotation may be used to distinguish the non-HE PPDU and the HE PPDU from each other. The automatic detection method may determine whether a PPDU based on a change (or a change in constellation) of a modulation method used for an OFDM symbol transmitting a specific field is the non-HE PPDU or the HE PPDU.

For example, in the non-HE PPDU that includes the L-SIG and a very high throughput (VHT)-SIG A transmitted after the L-SIG, the HT-SIG is modulated based on a first modulation method to be transmitted on the first OFDM symbol. For example, in the HE PPDU that includes the L-SIG and the HE-SIG A transmitted after the L-SIG, the HE-SIG A 950 is modulated based on a second modulation method to be transmitted on the second OFDM symbol. When the modulation method of the modulation symbol transmitted on the first OFDM symbol is the first modulation method, the STA or the AP may determine the received PPDU as the non-HE PPDU and on the contrary, when the modulation method of the modulation symbol transmitted on the first OFDM symbol is the second modulation method, the STA or the AP may determines the received PPDU as the HE PPDU.

The HE-SIG A 950 positioned next to the L-SIG may be transmitted on the OFDM symbol including the normal GI for determination of the received PPDU to use the auto-detection method.

The HE-SIG 960 may be transmitted on the OFDM symbol including the longer GI. Alternatively, the information on the GI included in the OFDM symbol for transmission of the HE-SIG B 960 may be included in the HE-SIG A 950. For example, the HE-SIG A 950 may include information regarding whether the GI included in the OFDM symbol for transmission of the HE-SIG B 960 is the normal GI or the longer GI. The HE-SIG 960 may be transmitted on the OFDM symbol including the GI indicated based on the HE-SIG A 950.

Similarly, in the HE PPDU, the HE-SIG A 950 may be transmitted on one OFDM symbol and the HE-SIG B 960 may be transmitted on the plurality of OFDM symbols. The total symbol duration of the OFDM symbols for transmission of the HE-SIG A 950 may be 4 µs. When the longer GI is used for transmission of the HE-SIG A 960, the total symbol duration of the OFDM symbols for transmission of the HE-SIG A 960 may be 6.4 µs. The HE-SIG A 950 may have a transmission duration of 6.4 µs and the HE-SIG B 960 may have a transmission duration of x*6.4 µs. x represents the number of OFDM symbols allocated to the HE-SIG B 960.

The HE-SIG B 960 may be transmitted on a fixed number of, i.e., two or three OFDM symbols. The number of OFDM symbols for transmission of the HE-SIG B 960 may be determined dependently based on the size of the total bandwidth for transmission of the HE-SIG B 960.

Figure 10:
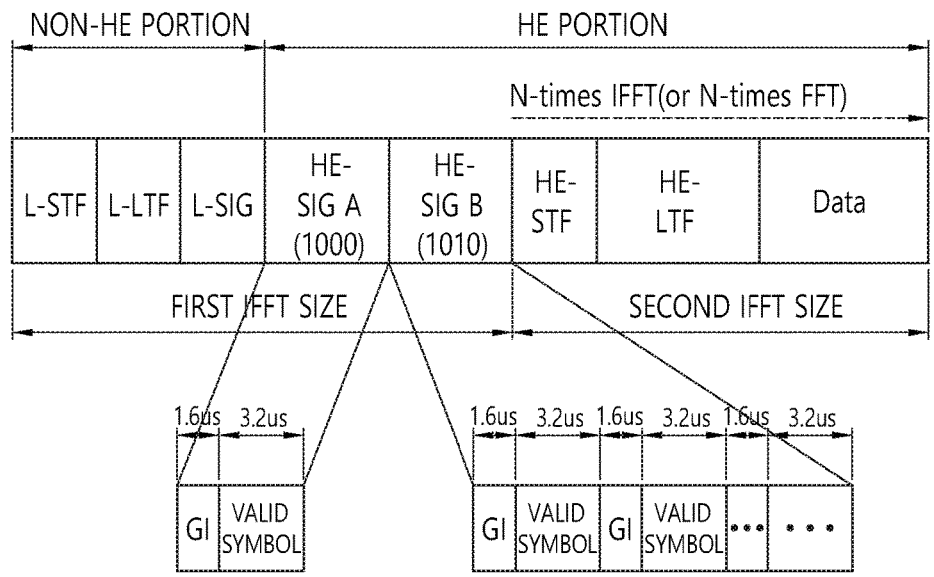
FIG. 10 is a conceptual view illustrating an HE PPDU according to an embodiment of the present invention.
Figure 10:
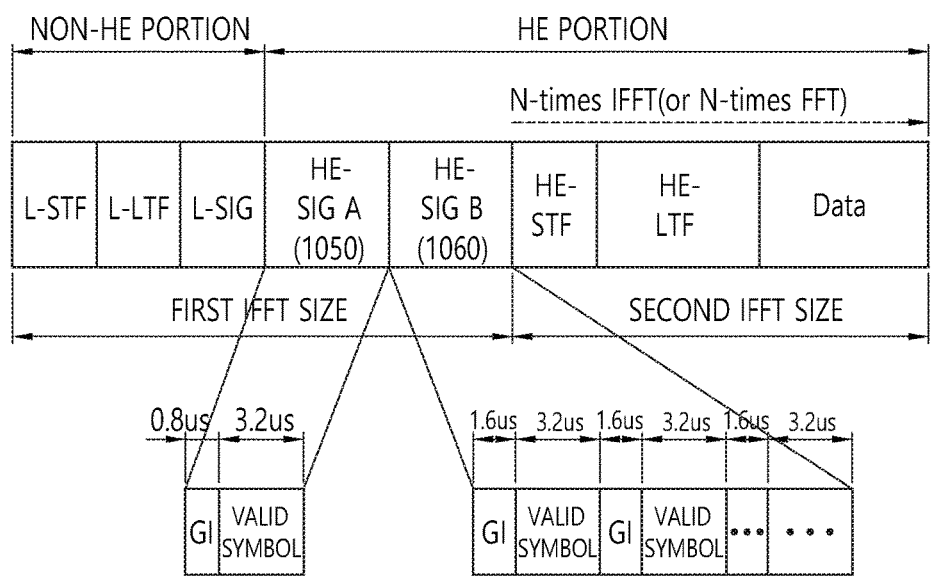

FIG. 10 is a conceptual view illustrating an HE PPDU according to an embodiment of the present invention.

In FIG. 10, a long GI set to a different value is disclosed according to the system performance margin. The longer GI may be set to a value (e.g., 1.6 µs or 2.4 µs) other than 3.2 µs (=4*normal GI).

The upper part of FIG. 10 discloses a case where a longer GI of 1.6 µs is used for transmission of HE-SIG A 1000 and HE-SIG B 1010.

In the HE PPDU, the HE-SIG A 1000 may be transmitted on one OFDM symbol and the HE-SIG B 1010 may be transmitted on the plurality of OFDM symbols. The total symbol duration of the OFDM symbols for transmission of the HE-SIG A 1000 and the HE-SIG B 1010 may be 4.8 µs. The total symbol duration of 4.8 µs may include a GI duration of 1.6 µs and a valid symbol duration of 3.2 µs.

The HE-SIG B 1010 may be transmitted on a fixed number of, i.e., two or three OFDM symbols. The number of OFDM symbols for transmission of the HE-SIG B 1010 may be determined dependently based on the size of the total bandwidth for transmission of the HE-SIG B 1010.

The lower part of FIG. 10 discloses a case where the normal GI of 0.8 µs is used for transmission of HE-SIG A 1050 and the longer GI of 1.6 µs is used for transmission of HE-SIG B 1060.

In the HE PPDU, the HE-SIG A 1050 may be transmitted on one OFDM symbol and the HE-SIG B 1060 may be transmitted on the plurality of OFDM symbols. The total symbol duration of the OFDM symbols for transmission of the HE-SIG A 1050 may be 4 µs. The total symbol duration of 4 µs may include the GI duration of 0.8 µs and the valid symbol duration of 3.2 µs. The total symbol duration of the OFDM symbols for transmission of the HE-SIG A 1060 may be 4.8 µs. The total symbol duration of 4.8 µs may include the GI duration of 1.6 µs and the valid symbol duration of 3.2 µs.

The HE-SIG B 1060 may be transmitted on a fixed number of, i.e., two or three OFDM symbols. The number of OFDM symbols for transmission of the HE-SIG B 1060 may be determined dependently based on the size of the total bandwidth for transmission of the HE-SIG B 1060.

Figure 11:
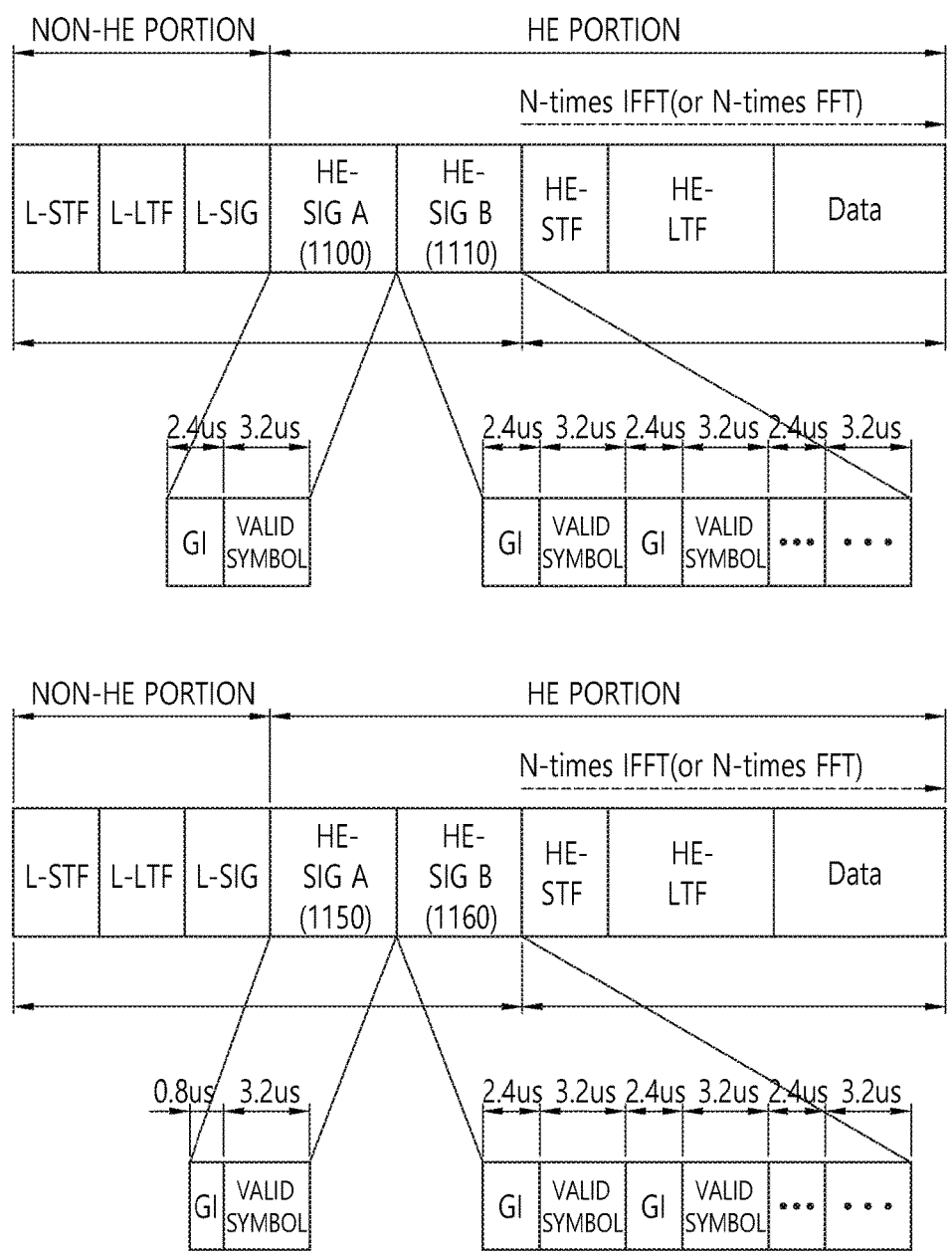
FIG. 11 is a conceptual view illustrating an HE PPDU according to an embodiment of the present invention.

FIG. 11 is a conceptual view illustrating an HE PPDU according to an embodiment of the present invention.

In FIG. 11, a longer GI set to a different value is disclosed according to the system performance margin. The longer GI may be set to a value (e.g., 1.6 µs or 2.4 µs) other than 3.2 µs (=4*normal GI).

FIG. 11(*a*) discloses a case where a longer GI of 2.4 µs is used for transmission of HE-SIG A 1100 and HE-SIG B 1110.

In the HE PPDU, the HE-SIG A 1100 may be transmitted on one OFDM symbol and the HE-SIG B 1110 may be transmitted on the plurality of OFDM symbols. The total symbol duration of the OFDM symbols for transmission of the HE-SIG A 1100 and the HE-SIG B 1110 may be 5.6 µs. The total symbol duration of 5.6 µs may include the GI duration of 2.4 µs and the valid symbol duration of 3.2 µs.

The HE-SIG B 1110 may be transmitted on a fixed number of, i.e., two or three OFDM symbols. The number of OFDM symbols for transmission of the HE-SIG B 1110 may be determined dependently based on the size of the total bandwidth for transmission of the HE-SIG B.

FIG. 11(*b*) discloses a case where the normal GI of 0.8 µs is used for transmission of HE-SIG A 1150 and the longer GI of 2.4 µs is used for transmission of HE-SIG B 1160.

In the HE PPDU, the HE-SIG A 1150 may be transmitted on one OFDM symbol and the HE-SIG B 1160 may be transmitted on the plurality of OFDM symbols. The total symbol duration of the OFDM symbols for transmission of the HE-SIG A 1150 may be 4 µs. The total symbol duration of 4 µs may include the GI duration of 0.8 µs and the valid symbol duration of 3.2 µs. The total symbol duration of the OFDM symbols for transmission of the HE-SIG A 1160 may be 5.6 µs. The total symbol duration of 5.6 µs may include the GI duration of 2.4 µs and the valid symbol duration of 3.2 µs.

The HE-SIG B 1160 may be transmitted on a fixed number of, i.e., two or three OFDM symbols. The number of OFDM symbols for transmission of the HE-SIG B 1160 may be determined dependently based on the size of the total bandwidth for transmission of the HE-SIG B 1160.

Figure 12:
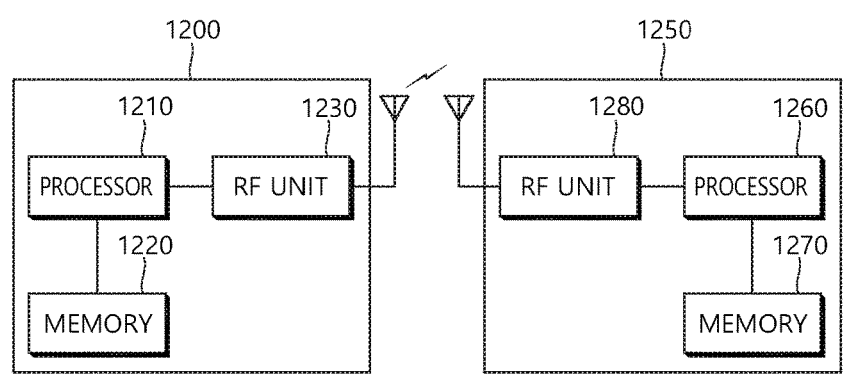
FIG. 12 is a block diagram illustrating a wireless apparatus to which an embodiment of the present invention can be applied.

FIG. 12 is a block diagram illustrating a wireless apparatus to which an embodiment of the present invention can be applied.

Referring to FIG. 12, the wireless apparatus 1200 as an STA capable of implementing the aforementioned embodiment may be an AP 1200 or a non-AP station (alternatively, STA) 1250.

The AP 1200 may include a processor 1210, a memory 1220, and a radio frequency (RF) unit 1230.

The RF unit 1230 is connected with the processor 1210 to transmit/receive a radio signal.

The processor 1210 implements a function, a process, and/or a method which are proposed in the present invention. For example, the processor 1210 may be implemented to perform the operation of the wireless apparatus according to the embodiment of the present invention. The processor may perform the operation of the AP disclosed in the embodiment of FIGS. 2 to 11.

For example, the processor 1210 may be implemented to generate a PHY protocol data unit (PPDU) and transmit the PPDU to at least one reception STA. The PPDU sequentially includes the first signal field, the second signal field, and the training field, and the first signal field may be generated based on the first inverse fast Fourier transform (IFFT) size and transmitted on the first orthogonal frequency division multiplexing (OFDM) symbol and the second signal field may be generated based on the first IFFT size and transmitted on the second OFDM symbol. The training field is generated based on the second IFFT size to be transmitted on the third OFDM symbol and the second IFFT size may be integer times larger than the first IFFT size. The total symbol duration of the first OFDM symbol may include a first guard interval (GI) duration determined based on the first IFFT size and a first valid symbol duration determined based on the first IFFT size. The total symbol duration of the second OFDM symbol may include a second GI duration which is integer times larger than the first GI duration and the first valid symbol duration. The total symbol duration of the third OFDM symbol may include a third guard interval (GI) duration determined based on the second IFFT size and a second valid symbol duration determined based on the second IFFT size.

The PPDU may further include a third signal field (e.g. HE-SIG B) positioned between the second signal field and the training field, the third signal field may be generated based on the first IFFT size and transmitted on a fourth OFDM symbol, and the total symbol duration of the fourth OFDM symbol may include the second GI duration and the first valid symbol duration.

The third signal field may include resource allocation information and the resource allocation information may include the information on the number of subbands allocated to each of the at least one STA.

The second signal field (e.g., HE-SIG A) may include the resource allocation analysis information for analyzing the resource allocation information and the resource allocation analysis information may include the information on the number of one or more STAs and the information on the maximum number of subbands allocable to each of one or more STAs.

The first IFFT size may be 64, the second IFFT size may be 256, the first GI duration may be 0.8 µs, the second GI duration may be 3.2 µs, the third GI duration is 3.2 µs, the first valid symbol duration may be 3.2 µs, and the second valid symbol duration may be 12.8 µs.

The STA 1250 may include a processor 1260, a memory 1270, and a radio frequency (RF) unit 1280.

The RF unit 1280 is connected with the processor 1260 to transmit/receive a radio signal.

The processor 1260 implements a function, a process, and/or a method which are proposed in the present invention. For example, the processor 1210 may be implemented to perform the operation of the wireless apparatus according to the embodiment of the present invention. The processor may perform the operation of the wireless apparatus disclosed in the embodiment of FIGS. 2 to 11.

For example, the processor 1260 may be implemented to generate the PPDU and transmit the PPDU to at least one reception STA. The PPDU sequentially includes the first signal field, the second signal field, and the training field, and the first signal field may be generated based on the first inverse fast Fourier transform (IFFT) size and transmitted on the first orthogonal frequency division multiplexing (OFDM) symbol and the second signal field may be generated based on the first IFFT size and transmitted on the second OFDM symbol. The training field is generated based on the second IFFT size to be transmitted on the third OFDM symbol and the second IFFT size may be integer times larger than the first IFFT size. The total symbol duration of the first OFDM symbol may include a first GI duration determined based on the first IFFT size and a first valid symbol duration determined based on the first IFFT size. The total symbol duration of the second OFDM symbol may include a second GI duration which is integer times larger than the first GI duration and the first valid symbol duration. The total symbol duration of the third OFDM symbol may include a third GI duration determined based on the second IFFT size and a second valid symbol duration determined based on the second IFFT size.

The PPDU may further include a third signal field (e.g. HE-SIG B) positioned between the second signal field and the training field, the third signal field may be generated based on the first IFFT size and transmitted on a fourth OFDM symbol, and the total symbol duration of the fourth OFDM symbol may include the second GI duration and the first valid symbol duration.

The third signal field may include resource allocation information and the resource allocation information may include the information on the number of subbands allocated to each of the at least one STA.

The second signal field (e.g., HE-SIG A) may include the resource allocation analysis information for analyzing the resource allocation information and the resource allocation analysis information may include the information on the number of one or more STAs and the information on the maximum number of subbands allocable to each of one or more STAs.

The first IFFT size may be 64, the second IFFT size may be 256, the first GI duration may be 0.8 µs, the second GI duration may be 3.2 µs, the third GI duration is 3.2 µs, the first valid symbol duration may be 3.2 µs, and the second valid symbol duration may be 12.8 µs.

The processors 1210 and 1260 may include an application-specific integrated circuit (ASIC), other chipset, a logic circuit, a data processing device, and/or a converter that converts a baseband signal and the radio signal to each other. The memories 1220 and 1270 may include a read-only memory (ROM), a random access memory (RAM), a flash memory, a memory card, a storage medium, and/or other storage devices. The RF units 1230 and 1280 may include one or more antennas that transmit and/or receive the radio signal.

When the embodiment is implemented by software, the aforementioned technique may be implemented by a module (a process, a function, and the like) that performs the aforementioned function. The module may be stored in the memories 1220 and 1270 and executed by the processors 1210 and 1260. The memories 1220 and 1270 may be positioned inside or outside the processors 1210 and 1260 and connected with the processors 1210 and 1260 through various well-known means.

What is claimed is:

1. A method for transmitting a data unit in a wireless local area network (WLAN) system, the method comprising:
    generating, by a transmission station (STA), a PHY protocol data unit (PPDU); and
    transmitting, by the transmission STA, the PPDU to a plurality of reception STAs,
    wherein the PPDU sequentially includes a legacy-signal (L-SIG) field, a high efficiency signal A (HE-SIG A) field, a HE-SIG B field, and a training field,
    wherein the L-SIG field is generated based on a first inverse fast Fourier transform (IFFT) size and transmitted on a first orthogonal frequency division multiplexing (OFDM) symbol, wherein a first symbol duration of the first OFDM symbol includes a first guard interval (GI) duration determined based on the first IFFT size and a first valid symbol duration determined based on the first IFFT size, wherein the HE-SIG A field is generated based on the first IFFT size and transmitted on a second OFDM symbol, wherein a second symbol duration of the second OFDM symbol includes a second GI duration which is integer times longer than the first GI duration and the first valid symbol duration, wherein the HE-SIG B field is generated based on the first IFFT size and transmitted on a third OFDM symbol, wherein a third symbol duration of the third OFDM symbol includes the second GI duration and the first valid symbol duration, wherein the training field is generated based on a second IFFT size and transmitted on a fourth OFDM symbol, wherein a fourth symbol duration of a fourth OFDM symbol includes a third guard interval (GI) duration determined based on the second IFFT size and a second valid symbol duration determined based on the second IFFT size, and wherein the second IFFT size is integer times larger than the first IFFT size.

2. The method of claim 1, wherein the HE-SIG B field includes resource allocation information, and wherein the resource allocation information includes identification information on the plurality of reception STAs and resource allocation information on a plurality of downlink subbands individually allocated for the plurality of reception STAs based on an orthogonal frequency division multiple access (OFDMA).

3. The method of claim 2, wherein the HE-SIG A field includes resource allocation analysis information for interpreting the resource allocation information, and wherein the resource allocation analysis information includes information on a total number of the plurality of reception STAs and information on a maximum number of space-time streams allocable to one reception STA.

4. The method of claim 1, wherein the first IFFT size is 64, the second IFFT size is 256, the first GI duration is 0.8 µs, the second GI duration is 3.2 µs, the third GI duration is 3.2 µs, the first valid symbol duration is 3.2 µs, and the second valid symbol duration is 12.8 µs.

5. A station (STA) transmitting a data unit in a wireless local area network (WLAN), the STA comprising:

a radio frequency (RF) unit transmitting and receiving a radio signal; and a processor operatively connected with the RF unit, wherein the processor is implemented to:

generate a PHY protocol data unit (PPDU), and transmit the PPDU to a plurality of reception STAs, wherein the PPDU sequentially includes a legacy-signal (L-SIG) field, a high efficiency signal A (HE-SIG A) field, a HE-SIG B field, and a training field, wherein the L-SIG field is generated based on a first inverse fast Fourier transform (IFFT) size and transmitted on a first orthogonal frequency division multiplexing (OFDM) symbol, wherein a first symbol duration of the first OFDM symbol includes a first guard interval (GI) duration determined based on the first IFFT size and a first valid symbol duration determined based on the first IFFT size, wherein the HE-SIG A field is generated based on the first IFFT size and transmitted on a second OFDM symbol, wherein a second symbol duration of the second OFDM symbol includes a second GI duration which is integer times longer than the first GI duration and the first valid symbol duration, wherein the HE-SIG B field is generated based on the first IFFT size and transmitted on a third OFDM symbol, wherein a third symbol duration of the third OFDM symbol includes the second GI duration and the first valid symbol duration, wherein the training field is generated based on a second IFFT size and transmitted on a fourth OFDM symbol, wherein a fourth symbol duration of a fourth OFDM symbol includes a third guard interval (GI) duration determined based on the second IFFT size and a second valid symbol duration determined based on the second IFFT size, and wherein the second IFFT size is integer times larger than the first IFFT size.

6. The STA of claim 5, wherein the HE-SIG B field includes resource allocation information, and wherein the resource allocation information includes identification information on the plurality of reception STAs and resource allocation information on a plurality of downlink subbands individually allocated for the plurality of reception STAs based on an orthogonal frequency division multiple access (OFDMA).

7. The STA of claim 6, wherein the HE-SIG A field includes resource allocation analysis information for interpreting the resource allocation information, and wherein the resource allocation analysis information includes information on a total number of the plurality of reception STAs and information on a maximum number of space-time streams allocable to one reception STA.

8. The STA of claim 5, wherein the first IFFT size is 64, the second IFFT size is 256, the first GI duration is 0.8 µs, the second GI duration is 3.2 µs, the third GI duration is 3.2 µs, the first valid symbol duration is 3.2 µs, and the second valid symbol duration is 12.8 µs.

* * * * *